US012725298B2

(12) United States Patent
Wen et al.

(10) Patent No.: US 12,725,298 B2
(45) Date of Patent: Sep. 1, 2026

(54) MODEL TRAINING METHOD AND APPARATUS, DEVICE, MEDIUM, AND PROGRAM PRODUCT

(71) Applicant: Tencent Technology (Shenzhen) Company Limited, Shenzhen (CN)

(72) Inventors: Shaoguo Wen, Shenzhen (CN); Junle Wang, Shenzhen (CN); Zixiao Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 456 days.

(21) Appl. No.: 18/199,235

(22) Filed: May 18, 2023

(65) Prior Publication Data

US 2023/0290003 A1 Sep. 14, 2023

Related U.S. Application Data

(63) Continuation of application No. PCT/CN2022/120169, filed on Sep. 21, 2022.

(30) Foreign Application Priority Data

Nov. 24, 2021 (CN) ......................... 202111398623.5

(51) Int. Cl.
*G06T 7/73* (2017.01)
*G06V 10/774* (2022.01)
(Continued)

(52) U.S. Cl.
CPC .............. *G06T 7/74* (2017.01); *G06V 10/774* (2022.01); *G06V 10/776* (2022.01); *G06V 20/41* (2022.01);
(Continued)

(58) Field of Classification Search
None
See application file for complete search history.

(56) References Cited

U.S. PATENT DOCUMENTS 11,367,313 B2 * 6/2022 Shen .................... G06V 10/764
11,514,706 B2 * 11/2022 Dong .................... G06F 18/217
(Continued)

FOREIGN PATENT DOCUMENTS

CN 113554034 A 10/2021
CN 113822254 A 12/2021

OTHER PUBLICATIONS

Example-Based Object Detection in Images by Components , by Mohan et al., IEEE Transactions on Pattern Analysis and Machine Intelligence, vol. 23, No. 4, Apr. 2001 (Year: 2001).*
(Continued)

*Primary Examiner* — Vikkram Bali
(74) *Attorney, Agent, or Firm* — Morgan, Lewis & Bockius LLP

(57) ABSTRACT

Embodiments of this application disclose a model training method performed by a computer device. The method includes: respectively performing, through m reference object key point detection models, object key point detection processing on a target training image to obtain key point detection results of predicted positions of key points respectively corresponding to a plurality of object key parts in a target training image; for each object key part whose associated predicted position of a key point corresponding to the object key part in the m key point detection results indicates that the object key part is a target object key part, determining a labeling position corresponding to the target object key part as a corresponding key point labeling result; and
(Continued)

training a target object key point detection model using the target training image and the key point labeling results corresponding thereto.

18 Claims, 8 Drawing Sheets

(51) Int. Cl.
*G06V 10/776* (2022.01)
*G06V 20/40* (2022.01)
*G06V 40/10* (2022.01)

(52) U.S. Cl.
CPC .... *G06V 40/10* (2022.01); *G06T 2207/10016* (2013.01); *G06T 2207/20081* (2013.01); *G06T 2207/30196* (2013.01)

(56) References Cited

U.S. PATENT DOCUMENTS

| | | | | |
|---|---|---|---|---|
| 11,645,506 | B2 * | 5/2023 | Wang | G06N 3/0454 706/15 |
| 2020/0394416 | A1 | 12/2020 | Gong et al. | |
| 2023/0137337 | A1 * | 5/2023 | Maji | G06V 10/82 382/100 |

OTHER PUBLICATIONS

Tencent Technology, WO, PCT/CN2022/120169, Nov. 25, 2022, 5 pgs.
Tencent Technology, IPRP, PCT/CN2022/120169, May 2, 2024, 6 pgs.
Tencent Technology, Extended European Search Report, EP Patent Application No. 22897330.1, Oct. 29, 2024, 14 pgs.
Arash Samari et al., "Weakly Supervised Bounding Box Extraction for Unlabeled Data in Table Detection", In: Pattern Recognition. ICPR International Workshops and Challenges, Lecture Note in Computer Science, vol. 12667, DOI: 10.1007/978-3-030-68787-8_25, Feb. 2021, 14 pgs.
He Wang et al., "3DIoUMatch: Leveraging IoU Prediction for Semi-Supervised 3D Object Detection", IEEE/CVF Conference on Computer Vision and Pattern Recognition (CVPR), DOI: 10.1109/CVPR46437.2021.01438, Jun. 2021, 10 pgs.
Sofie Verbaeten et al., "Ensemble Methods for Noise Elimination in Classification Problems", In: Multiple Classifier Systems, Lecture Notes in Computer Science, vol. 2709, DOI: 10.1007/3-540-44938-8_32, Jan. 2003, 9 pgs.
Weifang Ge et al., "Multi-Evidence Filtering and Fusion for Multi-Label Classification, Object Detection and Semantic Segmentation Based on Weakly Supervised Learning", IEEE/CVF Conference on Computer Vision and Pattern Recognition, DOI: 10.1109/CVPR.2018.00139, Jun. 2018, 10 pgs.
Xuanyi Dong et al., "Few-Example Object Detection with Model Communication", IEEE Transactions on Pattern Analysis and Machine Intelligence, vol. 41, Issue 7, DOI: 10.1109/TPAMI.2018.2844853, Jun. 2018, 14 pgs.
Youjiang Xu et al., "Training Robust Object Detectors from Noisy Category Labels and Imprecise Bounding Boxes", IEEE Transactions on Image Processing, vol. 30, DOI: 10.1109/TIP.2021.3085208, Jun. 2021, 11 pgs.
Zixiang Pei et al., "CFM: A Consistency Filtering Mechanism for Road Damage Detection", IEEE International Conference on Big Data, DOI: 10.1109/BigData50022.2020.9377911, Dec. 2020, 8 pgs.
Xiao-Xuan Sun et al. "Research on Semi-Automatic Generation Technology of Object Detection Datasets", Computer Systems & Applications, vol. 28. No. 10, Oct. 31, 2019, 7 pgs.
Tencent Technology, ISR, PCT/CN2022/120169, Nov. 25, 2022, 2 pgs.

* cited by examiner (a)

(b)

1110
RF circuit
WiFi module
1170
1190
1180
1160
Loudspeaker 1161
Power supply
Audio circuit
1120
Processor
Microphone 1162
Memory
Sensor
1150
Input unit
1131
Touch panel
Display unit
1130
1140
Other input devices
Display panel
1132
1141

MODEL TRAINING METHOD AND APPARATUS, DEVICE, MEDIUM, AND PROGRAM PRODUCT

CROSS-REFERENCE TO RELATED APPLICATIONS

This application is a continuation application of PCT Patent Application No. PCT/CN2022/120169, entitled "MODEL TRAINING METHOD AND APPARATUS, DEVICE, MEDIUM, AND PROGRAM PRODUCT" filed on Sep. 21, 2022, which claims priority to Chinese Patent Application No. 202111398623.5 filed with the National Intellectual Property Administration on Nov. 24, 2021 and entitled "MODEL TRAINING METHOD AND APPARATUS, DEVICE, MEDIUM, AND PROGRAM PRODUCT", all of which is incorporated by reference in its entirety.

FIELD OF THE TECHNOLOGY

This application relates to the field of artificial intelligence technologies, and in particular, to model training.

BACKGROUND OF THE DISCLOSURE

Human key point detection technology is also referred to as human body posture estimation technology. The technology is used for recognizing positions of important joint points (such as nose, left and right eyes, left and right ears, left and right shoulders, left and right elbows, left and right wrists, left and right buttocks, left and right knees, and left and right ankles) on human body skeletons in an image. Nowadays, the human body key point detection technology is widely used in many scenarios, for example, in a motion sensing game scenario, the human body key point detection technology is used for detecting changes in body movement of a player, so as to facilitate subsequent execution of corresponding game logic according to a detection result.

The human body key point detection technology is mainly realized relying on a human body key point detection model. That is, positions of important joint points on human body skeletons in an image are determined according to the input image through the human body key point detection model. In an actual application, due to time consumption and labor consumption in labeling human body key point data, it is difficult to label sufficient data for training a human body key point detection model. In order to ensure detection efficiency of human body key points, the human body key point detection model that is actually put into use can also not be too complex. Therefore, in a related technology, when the human body key point detection model that is actually put into use is trained, a human body key point detection model which has a complex structure and high performance is often used for performing human body key point detection processing on an unlabeled image first to determine positions of human body key points in the image as pseudo labels of the image. Then the image and the pseudo labels are taken as training samples, and the human body key point detection model that needs to be actually put into use and that has a simple structure is trained by using the training samples.

However, the model performance of the human body key point detection model is limited even it has a complex structure, so it is difficult to ensure the accuracy of the determined pseudo labels, that is, the pseudo labels generated in the above manner often have a lot of noise. Correspondingly, the performance of a trained human body key point detection model will be affected by training the human body key point detection model that needs to be actually put into use by using the training samples including the pseudo labels.

SUMMARY

Embodiments of this application provide a model training method and a related apparatus, so that the accuracy of a determined pseudo label can be improved, thereby improving the performance of a human body key point detection model trained based on a training sample including the pseudo label.

In view of this, a first aspect of this application provides a model training method. The method includes:

respectively performing, through m reference object key point detection models, object key point detection processing on a plurality of object key parts of a target object within a target training image to obtain key point detection results respectively corresponding to the m reference object key point detection models, the key point detection result comprising a predicted position of a key point corresponding to each of the plurality of object key parts in the target training image, and M being an integer greater than 1;

for each object key part whose associated predicted position of a key point corresponding to the object key part in the m key point detection results indicates that the object key part is a target object key part, determining a labeling position corresponding to the target object key part as a corresponding key point labeling result; and training a target object key point detection model using the target training image and the key point labeling results corresponding thereto.

A second aspect of this application provides a computer device. The device includes a processor and a memory.

The memory is configured to store a computer program.

The processor is configured to perform steps of the model training method as described in the first aspect above according to the computer program.

A third aspect of this application provides a non-transitory computer-readable storage medium storing a computer program. The computer program, when executed by a processor of a computer device, is used for performing steps of the model training method as described in the first aspect above.

It can be learned from the foregoing technical solutions that the embodiments of this application have the following advantages:

The embodiments of this application provide a model training method. When the method generates a training sample used for training an object key point detection model that needs to be actually put into use, object key point detection processing may be performed on the target training image through m (m is an integer greater than 1) reference object key point detection models to obtain key point detection results respectively corresponding to the m reference object key point detection models. Here, each key point detection result includes the predicted position of the key point corresponding to each of the plurality of object key parts in the target training image. Then, based on the principle that the predicted positions of the same object key part in various key point detection results are basically consistent, for each object key part, whether a position prediction result of each reference object key point detection model for the object key part is reliable is measured according to the predicted position of the key point corresponding to the object key part in each key point detection result, that is, whether the object key part is the target object key part is determined. When it is determined that the position prediction result of each reference object key point detection model for the object key part is reliable, the labeling position corresponding to the target object key part is further determined as a pseudo label. Then, a training sample is formed by using the target training image and the labeling position corresponding to each target object key part. Thus, the object key part with an unreliable position prediction result is ignored, and only the labeling position corresponding to the object key part with a reliable position prediction result is used the pseudo label, which can effectively reduce the noise in the determined pseudo label, and improve the accuracy of the pseudo label. Correspondingly, the performance of a trained target object key point detection model can be ensured to a certain extent by training the target object key point detection model that needs to be actually put into use and has a complex structure based on the training sample including the pseudo label.

DESCRIPTION OF EMBODIMENTS

Figure 1:
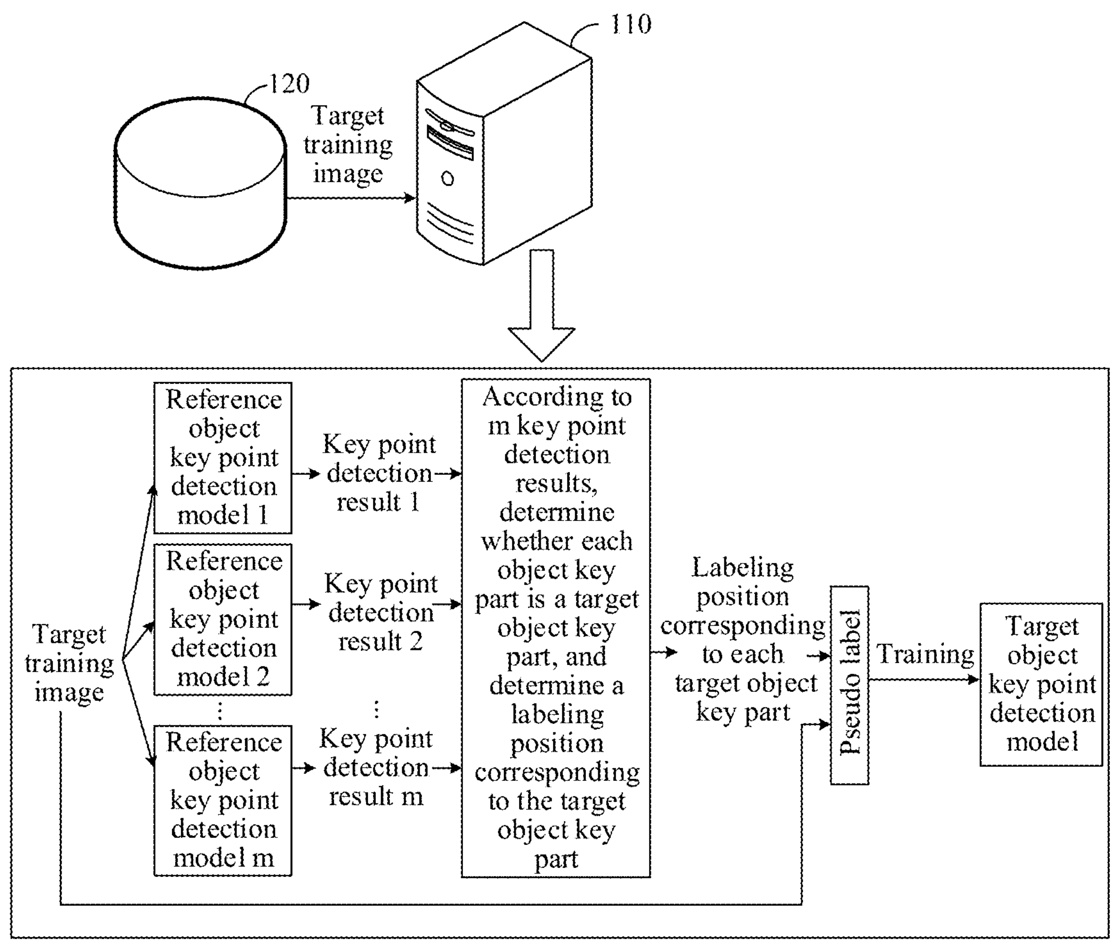
FIG. 1 is a schematic diagram of an application scenario of a model training method provided by an embodiment of this application.

In order to enable a person skilled in the art to better under the solutions of this application, the following clearly and completely describes the technical solutions of the embodiments of this application with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

Terms "first", "second", "third", "fourth", etc., (if existing), in the specification, claims, and drawings of the disclosure are adopted not to describe a specific sequence or order but to distinguish similar objects. It will be understood that data used in such a way may be exchanged under appropriate conditions, in order that the embodiments of the application described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

With the research and progress of artificial intelligence technology, the artificial intelligence technology has been studied and applied in a plurality of fields, for example, common smart homes, smart wearable devices, virtual assistants, smart speakers, smart marketing, unmanned driving, autonomous driving, unmanned aerial vehicles, robots, smart healthcare, smart customer service, Internet of vehicles, autonomous driving, smart transportation, and the like. Believing that with the development of technology, the artificial intelligence technology will be applied in more fields and play a more and more important role.

The solutions provided by the embodiments of this application relate to computer vision technology of artificial intelligence, and may be applied to various fields above, which is specifically described by the following embodiments:

in a related technology, a key point detection result of an object key point detection model with a complex structure for an unlabeled image is directly taken as a pseudo label corresponding to the unlabeled image; and then, a target object key point detection model that has a simple structure and that needs to be actually put into use is trained by using a training sample formed by the unlabeled image and the pseudo label corresponding thereto. The pseudo label generated in this manner generally has a lot of noise and low accuracy, which will have a negative impact on the model performance of the trained object key point detection model.

In order to solve the problems in the related technology above, an embodiment of this application provides a model training method. In the model training method, object key point detection processing is performed on the target training image through m (m is an integer greater than 1) reference object key point detection models first to obtain key point detection results respectively corresponding to the m reference object key point detection models. Here, each key point detection result includes the predicted position of the key point corresponding to each of the plurality of object key parts in the target training image. Then, for each object key part, whether the object key part is a target object key part is determined according to the predicted position of the key point corresponding to the object key part in the m key point detection results. When the object key part is the target object key part, a labeling position corresponding to the target object key part is determined according to the predicted position of the key point corresponding to the target object key part in the m key point detection results. Then, the target training image and the labeling position corresponding to each target object key part are taken as a training sample. The target object key point detection model that needs to be actually put into use and has a complex structure is trained based on the training sample.

When the above model training method generates the training sample used for training the object key point detection model that needs to be actually put into use, object key point detection processing will be performed on the target training image through a plurality of reference object key point detection models with complex structures to obtain a plurality of key point detection results. Then, based on the principle that the predicted positions of the same object key part in various key point detection results are basically consistent, for each object key part, whether a position prediction result of each reference object key point detection model for the object key part is reliable is measured according to the predicted position of the key point corresponding to the object key part in each key point detection result, that is, whether the object key part is the target object key part is determined. When it is determined that the position prediction result of each reference object key point detection model for the object key part is reliable, the labeling position corresponding to the target object key part is further determined as a pseudo label. Then, a training sample is formed by using the target training image and the labeling position corresponding to each target object key part. Thus, the object key part with an unreliable position prediction result is ignored, and only the labeling position corresponding to the object key part with a reliable position prediction result is used the pseudo label, which can effectively reduce the noise in the determined pseudo label, and improve the accuracy of the pseudo label. Correspondingly, the performance of a trained target object key point detection model can be ensured to a certain extent by training the target object key point detection model that needs to be actually put into use and has a complex structure based on the training sample including the pseudo label.

It is to be understood that the model training method provided by the embodiment of this application may be performed by a computer device with an image processing capacity. The computer device may be a terminal device or a server. The mobile terminal may be a computer, a smartphone, a tablet computer, a personal digital assistant (PDA), or the like. The server may specifically be an application server or a Web server, in actual deployment, may be an independent server, or may be a cluster server composed of a plurality of physical servers or a cloud server. Processing data (such as a training image, a key point detection result, and a key point labeling result) involved in the embodiment of this application may be saved on a blockchain.

In order to facilitate the understanding of the model training method provided by the embodiment of this application, an application scenario of the model training method is exemplarily introduced below by taking an example in which an execution subject of the model training method is a server.

Refer to FIG. 1, which is a schematic diagram of an application scenario of a model training method provided by an embodiment of this application. As shown in FIG. 1, the application scenario includes a server 110 and a database 120. The server 110 may retrieve data from the database 120 through a network, or the database 120 may also be integrated in the server 110. The server 110 is configured to perform the model training method provided by the embodiment of this application, so as to train a target object key point detection model that needs to be actually put into use and has a complex structure. The database 120 is configured to save an unlabeled training image.

In an actual application, the server 110 may retrieve a target training image from the database 120. The target training image includes an object to be detected. The object to be detected includes a plurality of object key parts. For example, the target training image may include a clear and complete human body to be detected.

Then, the server 110 may respectively perform, through m (m is an integer greater than 1) reference object key point detection models, object key point detection processing on the target training image to obtain key point detection results respectively corresponding to the m reference object key point detection models. Here, each key point detection result includes the predicted position of the key point corresponding to each of the plurality of object key parts in the target training image. The above reference object key point detection models are pre-trained object key point detection models, which can generally accurately detect the position of each object key part of an object to be detected in the image, and model structures of the reference object key point detection models are generally complex.

As an example, each reference object key point detection model above may be a reference human body key point detection model, and is used for detecting a position of each important joint on human body skeletons. Correspondingly, object key point detection processing is performed on the target training image through each reference human body object key point detection model to obtain a key point detection result corresponding to each reference human body object key point detection model. The key point detection result includes a predicted position of a key point corresponding to each important joint on the human body to be detected in the target training image.

Then, for each object key part, the server 110 may evaluate whether the position prediction results of the m reference object key point detection models for the object key part are reliable according to the predicted position of the key point corresponding to the object key part in the m key point detection results, that is, determine whether the object key part is the target object key part. When the object key part is the target object key part, a labeling position corresponding to the target object key part may be determined according to the predicted position of the key point corresponding to the target object key part in the m key point detection results.

It is to be understood that the position prediction results of different reference object key point detection models for the same object key part in the target training image are basically consistent, that is, a distance between the predicted positions of different reference object key point detection models for the same object key part is relatively small. If the distance between the predicted positions for the same object key part in the m key point detection results is relatively large, then it indicates that the predicted positions corresponding to the object key part in the m key point detection results are unreliable, and there may be great noise. In order to prevent the noise from being introduced into subsequent model training, the object key part may be ignored, and a labeling position corresponding to the object key part is not determined based on the predicted position for the object key part in the m key point detection results. On the contrary, if the distance between the predicted positions for the same object key part in the m key point detection results is relatively small, then it indicates that the predicted positions corresponding to the object key part in the m key point detection results are reliable. Correspondingly, the object key part may be considered as a target object key part, and a labeling position corresponding to the target object key part may be determined according to the predicted position corresponding to the target object key part in the m key point detection results.

After the above processing is performed on each object key part in the target training image, the labeling position corresponding to each target object key part in the target training image will be obtained, and then a key point labeling result corresponding to the target training image, that is, a pseudo label corresponding to the target training image, is formed by using the labeling position corresponding to each target object key part in the target training image. Then, the target training image and a key point labeling result corresponding thereto are taken as a training sample.

Then, the target object key point detection model is trained based on the training sample constructed in the above manner. The target object key point detection model is an object key point detection model that needs to be actually put into use, for example, may be a human body key point detection model that is applied in a motion sensing game and that is used for recognizing body movement of a player. Considering that the object key point detection model in an actual application needs to have high detection efficiency, so the object key point detection model with a relatively simple model structure is generally set as the above target object key point detection model.

It is to be understood that the application scenario as shown in FIG. 1 is only an example. In the actual application, the model training method provided by the embodiment of this application may also be applied to the scenarios, and no limits are made to the application scenario to which the model training method provided by the embodiment of this application is applied herein.

The model training method provided by the embodiment of this application is introduced in detail below through method embodiments.

Figure 2:
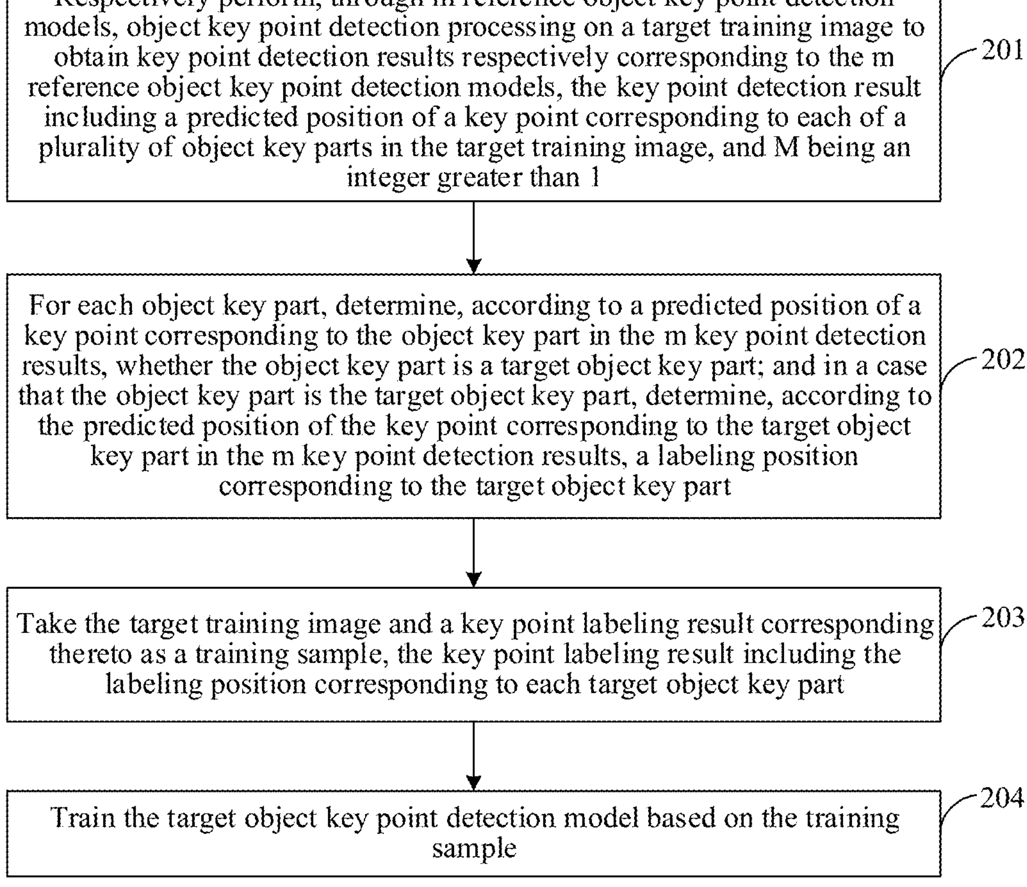
FIG. 2 is a schematic flowchart of a model training method provided by an embodiment of this application.

Refer to FIG. 2, which is a schematic flowchart of a model training method provided by an embodiment of this application. To facilitate describing, the following embodiment is also introduced by taking an example in which an execution subject of the model training method is a server. As shown in FIG. 2, the model training method includes the following steps:

Step 201: Respectively perform, through m reference object key point detection models, object key point detection processing on a target training image to obtain key point detection results respectively corresponding to the m reference object key point detection models. The key point detection result includes a predicted position of a key point corresponding to each of a plurality of object key parts in the target training image. M is an integer greater than 1.

In the embodiment of this application, when the server generates a pseudo label corresponding to a target training image for the target training image, object key point detection processing may be respectively performed, through m reference object key point detection models, on a target training image to obtain key point detection results of the m reference object key point detection models for the object training image, that is, key point detection results respectively corresponding to the m reference object key point detection models. Here, each key point detection result includes the predicted position of the key point corresponding to each of the plurality of object key parts in the target training image.

The pseudo label is training data that is commonly used in semi-supervised learning. Usually, unlabeled data may be processed through a complex model with higher performance to obtain a pseudo label corresponding to the unlabeled data. The pseudo label may be inaccurate. In the embodiment of this application, the pseudo label corresponding to the target training image may be determined according to the key point detection results of the m reference object key point detection models for the target training image. This application aims to process the key point detection results of the m reference object key point detection models for the target training image through a series of processing processes to obtain the pseudo label which can accurately reflect the position of the object key part in the target training image, so as to improve the performance of the target object key point detection model trained based on a training sample including the pseudo label.

The reference object key point detection model is a pre-trained model for detecting a position where an object key part is located on an object to be detected in an image, and can accurately detect the position where the object key part is located. Usually, in order to make the reference object key point detection model accurately detect the position of the object key part, the reference object key point detection model will be set to have a complex model structure. Exemplarily, each reference object key point detection model above may be a reference human body key point detection model and is used for detecting a position where each important joint is located on a human body in an image. The key point detection result of the reference human body key point detection model may be used for determining a human body posture. It is to be understood that m reference object key point detection models in the embodiment of this application may be obtained by training based on a same training sample set, or may also be obtained by training based on different training sample sets. No limits are made thereto in the embodiment of this application.

The target training image includes an image including the object to be detected. The object to be detected includes a plurality of object key parts. The object key part here includes a part that is on the object to be detected and that can reflect a posture of the object to be detected. Exemplarily, the target training image may be an image including a clear and complete human body to be detected. The human body to be detected includes a plurality of important joints, such as nose, left and right eyes, left and right ears, left and right shoulders, left and right elbows, left and right wrists, left and right buttocks, left and right knees, and left and right ankles.

The key point detection result corresponding to the reference object key point detection model is obtained by performing object key point detection processing on a target training image through the reference object key point detection model. The key point detection result includes a predicted position of a key point corresponding to each object key part on the object to be detected in the target training image. Exemplarily, assuming that the target training image is an image with a size of H×W, a thermodynamic feature map with a size of K×H×W will be output after the reference object key point detection model performs object key point detection processing on the target training image. K is a number of object key parts that need to be detected. The $k^{th}$ thermodynamic feature map in the K×H×W thermodynamic feature maps is used for representing the predicted position of the key point corresponding to the $k^{th}$ object key part in the target training image.

In a possible implementation, the server may obtain the key point detection result corresponding to each reference object key point detection model in the following manner.

For each reference object key point detection model, the reference object key point detection model performs object key point detection processing on the target training image, so as to determine a confidence that each pixel in the target training image belongs to the object key part. Then, the key point detection result corresponding to the reference object key point detection model is determined according to the pixel with the confidence that the pixel belongs to the object key part in the target training image greater than a preset confidence.

Figure 3:
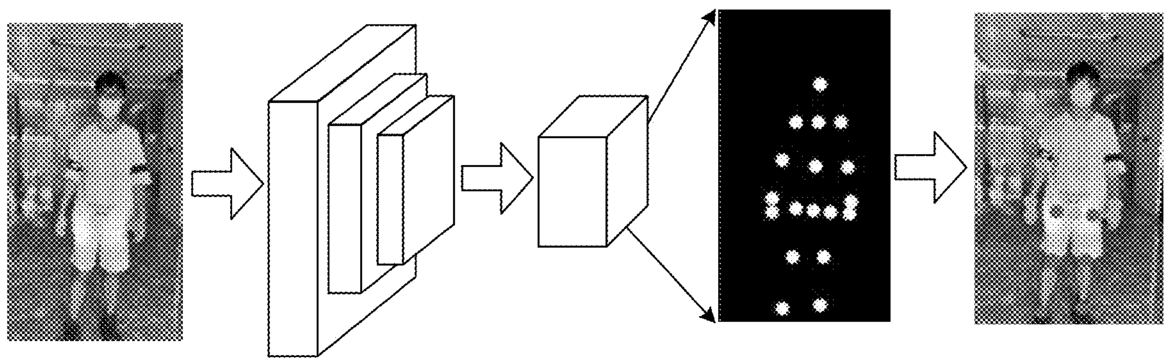
FIG. 3 is a schematic diagram of a working principle of a reference object key point detection model provided by an embodiment of this application.

Specifically, FIG. 3 is a schematic diagram of a working principle of a reference object key point detection model provided by an embodiment of this application. As shown in FIG. 3, after a server inputs a target training image with a size of H×W into a certain reference object key point detection model, the reference object key point detection model correspondingly outputs a thermodynamic feature map with a size of K×H×W by performing analysis processing on the target training image. The thermodynamic feature map is essentially composed of K thermodynamic feature maps with a size of H×W. Each thermodynamic feature map with the size of H×W includes a confidence that each pixel in the target training image belongs to an object key part corresponding to the thermodynamic feature map, for example, in the $k^{th}$ thermodynamic feature map with the size of H×W, each pixel has a corresponding confidence, and the confidence is used for characterizing a probability that the corresponding pixel belongs to the $k^{th}$ object key part.

For each thermodynamic feature map with the size of H×W, the server may ignore a corresponding pixel with the confidence less than or equal to a preset confidence (for example, 0.5) in the thermodynamic feature map, for example, the confidence corresponding to such pixels is directly adjusted to 0, and the pixel is considered not to be the object key part corresponding to the thermodynamic feature map by default. A predicted position of the object key part corresponding to the thermodynamic feature map is determined only according to the pixel corresponding to the confidence higher than the preset confidence, for example, the confidence corresponding to such pixels is adjusted to 1, and the pixel is considered to be the object key part corresponding to the thermodynamic feature map by default. Correspondingly, the position of the pixel corresponding to the confidence of 1 in the thermodynamic feature map can reflect the predicted position of the object key part corresponding to the thermodynamic feature map. Thus, after preliminary screening processing of the K thermodynamic feature maps with the size of K×H×W is completed in the above manner, the thermodynamic feature maps with the size of K×H×W obtained after preliminary screening processing may be taken the key point detection result corresponding to the reference object detection model.

Thus, an actual detection result of the reference object key point detection model is preprocessed to obtain the key point detection result corresponding to the reference object key point detection model, which can further reduce the noise in the key point detection result, meanwhile, prevent the server from performing unnecessary processing on such noise points subsequently, reduce the processing resources required, and further improve subsequent processing efficiency.

Step 202: For each object key part, determine, according to a predicted position of a key point corresponding to the object key part in the m key point detection results, whether the object key part is a target object key part; and when the object key part is the target object key part, determine, according to the predicted position of the key point corresponding to the target object key part in the m key point detection results, a labeling position corresponding to the target object key part.

After obtaining the key point detection results respectively corresponding to the m reference object key point detection models, the server may evaluate whether the position prediction result of the m reference object key point detection models for each object key part is reliable according to the m key point detection results. That is, for each object key part, the server may determine whether the object key part is a target object key part according to a predicted position of a key point corresponding to the object key part in the m key point detection results. When the object key part is determined as the target object key part, the server may further determine the labeling position corresponding to the target object key part according to the predicted position of the key point corresponding to the target object key part in the m key point detection results. Then, the server may form the key point labeling result corresponding to the target training image by using the labeling position corresponding to each target object key part in the target training image.

From the perspective of spatial consistency, the position prediction results of different reference object key point detection models for the same object key part in the target training image are basically consistent, that is, a distance between the predicted positions of different reference object key point detection models for the same object key part is relatively short. If the distance between the predicted positions for the same object key part in the m key point detection results is relatively long, then it indicates that the predicted positions corresponding to the object key part in the m key point detection results are unreliable, and there may be great noise. In order to prevent the noise from being introduced into subsequent model training, the embodiment of this application selects to ignore the object key part, and a labeling position corresponding to the object key part is not determined based on the predicted position corresponding to the object key part in the m key point detection results, that is, the pseudo label corresponding to the target training image is not generated based on the object key part. On the contrary, if the distance between the predicted positions for the same object key part in the m key point detection results is relatively short, then it indicates that the predicted positions corresponding to the object key part in the m key point detection results are reliable. Correspondingly, the object key part may be considered as a target object key part, and a labeling position corresponding to the target object key part may be determined according to the predicted position corresponding to the target object key part in the m key point detection results. Subsequently, a pseudo label corresponding to the target training image may also be determined based on the labeling position corresponding to the target object key part.

In a possible implementation, the server may evaluate whether the predicted position results of the m reference object key point detection models for each object key part are reliable in the following manner, that is, determine whether the object key part is the target object key part for each object key part in the following manner: determining, according the predicted position of the key point corresponding to the object key part in the m key point detection results, a reference position corresponding the object key part; then, for each key point detection result, determining a distance between the predicted position of the key point corresponding to the object key part and a reference position corresponding to the object key part, and determining, according to the distance, whether the key point detection result belongs to a target key point detection result corresponding to the object key part; and then counting a target quantity of target key point detection results corresponding to the object key parts in the m key point detection results. When the target quantity exceeds a preset quantity, the object key part may be determined as the target object key part. When the target quantity does not exceed a preset quantity, the object key part may be determined as a non-target object key part.

It is to be understood that the predicted position of the key point corresponding to the object key part is obtained by performing object key point detection processing on the target training image by the reference object key point detection model, that is, the position prediction result of the object key part output by the reference object key point detection model. The reference position corresponding to the object key part is determined according to the position prediction results of the object key part in the key point detection results of a plurality of reference object key point detection models, for example, being obtained by performing averaging processing on the predicted positions corresponding to the object key part in the plurality of the key point detection results The reference position is used for reflecting the distribution of the predicted positions corresponding to the object key parts in the plurality of key point detection results.

In order to facilitate the understanding of the above implementing process, the above implementing process is exemplarily introduced by taking an example of determining whether the "head" of the object key part is a target object key part. When determining whether the head belongs to the target object key part, the server may calculate an average value of the predicted positions of the key points corresponding to the head in the m key point detection results as a reference position corresponding to the head. Then, taking the reference position corresponding to the head as a center, for each key point detection result, a distance between a predicted position of the key point corresponding to the head in the key point detection result and the reference position is determined, and whether the distance is less than a first preset distance is determined (for example, the first preset distance may be 0.1 in a case of performing normalization processing on each position). If the distance is less than the first preset distance, it may be determined that the key point detection result belongs to the target key point detection result corresponding to the head. On the contrary, if the distance is not less than the first preset distance, it may be determined that the key point detection result does not belong to the target key point detection result corresponding to the head. After the above processing is completed for the m key point detection results, a target quantity of the target key point detection results corresponding to the head in the m key point detection results may be counted. If the target quantity corresponding to the head exceeds a preset quantity (for example, m/2), it may be determined that the head belongs to the target object key part. On the contrary, if the target quantity corresponding to the head does not exceed the preset quantity, it may be determined that the head belongs to a non-target object key part.

It is to be understood that parameters, such as the first preset distance and the preset quantity, may be set according to actual needs. No limits are made thereto in the embodiment of this application. In addition, both the implementation for determining the reference position corresponding to the object key part, and the implementation for determining whether the key point detection result belongs to the target key point detection result corresponding to the object key part described above may also set according to actual needs. No limits are made thereto in the embodiment of this application.

Whether the position prediction results of the m reference object key point detection models for each object key part are evaluated in the above manner, which can ensure the reliability of evaluation results, and effectively filter out the position prediction results with low reliability of the object key part. Correspondingly, it can be ensured that a subsequently determined pseudo label corresponding to the target training image has high reliability, and a large amount of noise is prevented from being doped therein.

In a case of determining whether each object key part is the target object key part by the above manner, the server may further determine the labeling position corresponding to the target object key part in the following manner. For each target key point detection result corresponding to the target object key part, the predicted position of the key point corresponding to the target object key part in the target key point detection result is determined as a target predicted position corresponding to the target object key part. Then, the labeling position corresponding to the target object key point is determined according to each target predicted position corresponding to the target object key part.

Exemplarily, for a certain target object key part, the server may acquire the predicted position of the key point corresponding to the target object key part in each target key point detection result corresponding to the target object key part as the target predicted position corresponding to the target object key part. Then, the server may calculate an average value of each target predicted position corresponding to the target object key part as the labeling position corresponding to the target object key part.

Thus, the labeling position corresponding to the target object key part is determined only according to the position prediction result of the target object key part in the target key point detection result corresponding to the target object key part, which can ensure the accuracy of the determined labeling position.

It is to be understood that, in an actual application, the server may also determine the labeling position corresponding to the target object key part in other manners, for example, a reference position corresponding to the target object key part (that is, an average value of the predicted positions of the key points corresponding to the target object key part in the m key point detection results) is taken as the labeling position corresponding to the target object key part. No limits are made to the manner of determining the labeling position corresponding to the target object key part herein in this application.

In some embodiments, when the target training image is a video frame in the target video, the server may also further evaluate the target object key part from the perspective of sequential continuity, so as to determine whether to reserve the above target object key part.

That is, the server may determine a video frame that is in the target video and that is adjacent to the target training image as a reference training image, and acquire a key point labeling result corresponding to the reference training image. The key point labeling result includes the labeling position corresponding to each target object key part in the reference training image. Then, for each target object key part, the labeling position of the target object key part in the key point labeling result corresponding to the target training image is determined as a first position, and the labeling position of the target object key part in the key point labeling result corresponding to the reference training image is determined as a second position. Whether to reserve the first position in the key point labeling result corresponding to target training image and whether to reserve the second position in the key point labeling result corresponding to the reference training image are determined according to a distance between the first position and the second position.

In an actual application, there will not be a great difference between adjacent video frames in the video, which means that the amplitude of changes of an object key part on the object to be detected in adjacent video frames will not be great. On this basis, the embodiment of this application may perform further evaluation processing on the target object key parts involved in the key point labeling results respectively corresponding to two adjacent video frames in the video.

Specifically, the server may determine a target video that the target training image belongs, and determine the video frame that is in the target video and that is adjacent to the target training image as a reference training image. The reference training image may be a previous video frame of the target training image or a next video frame of the target training image. Moreover, the key point labeling result corresponding to the reference training image is acquired. The manner of generating the key point labeling result corresponding to the reference training image is the same as the manner of generating the key point labeling result corresponding to the target training image. The key point labeling result corresponding to the reference training image includes the labeling position corresponding to each target object key part in the reference training image.

For each target object key part in the target training image and the reference training image, the server may determine the labeling position corresponding to the target object key part in the key point labeling result corresponding to the target training image as a first position, and determine the labeling position corresponding to the target object key part in the key point labeling result corresponding to the reference training image as a second position. Then, a distance between the first position and the second position is calculated, and whether the distance is less than a second preset distance is determined (for example, the second preset distance may be 0.2 in a case of performing normalization processing on each position). If the distance is less than the second preset distance, the labeling positions (namely, the first position and the second position) corresponding to the target object key part in the key point labeling results respectively corresponding to the target training image and the reference training image are reserved. On the contrary, if the distance is not less than the second preset distance, the labeling positions corresponding to the target object key part in the key point labeling results respectively corresponding to the target training image and the reference training image may be eliminated, that is, the target object key part is considered as an invalid object key part.

It is to be understood that, the above second preset distance may be set according to actual needs. No limits are made thereto in the embodiment of this application.

Thus, in the above manner, further screening processing is performed on the target object key part based on the sequential continuity, which helps to improve the accuracy of the determined key point labeling result, and can further filter out possible noise in the key point labeling result.

Step 203: Take the target training image and a key point labeling result corresponding thereto as a training sample. The key point labeling result includes the labeling position corresponding to each target object key part.

After obtaining the key point labeling result (including the labeling position corresponding to each target object key part in the target training image) corresponding to the target training image in the above manner, the server may form, by using the target training image and the key point labeling result corresponding thereto, the training sample used for the target object key point detection model that needs to be actually put into use. It is to be understood that the key point labeling result corresponding to the target training image herein is essentially the pseudo label corresponding to the target training image.

Step 204: Train the target object key point detection model based on the training sample.

In an actual application, the server may generate a large number of training samples by the above step 201 to step 203, and then, train, by using the generated training sample, the target object key point detection model that needs to be actually put into use.

The target object key point detection model is a model that is to be trained and that is used for detecting the position where the object key part is located on the object to be detected in an image, and it is a model that needs to be actually put into use. Usually, in order to ensure the detection efficiency in the actual application, the model structure of the target object key point detection model is generally relatively simple, that is, the complexity of the target object key point detection model is generally lower than that of the above reference object key point detection model. Exemplarily, the target object key point detection model may be a model used for detecting body movement of a player in a motion sensing game, and it is used for detecting the positions of important joint points of a human body in an image shot by a camera.

Figure 4:
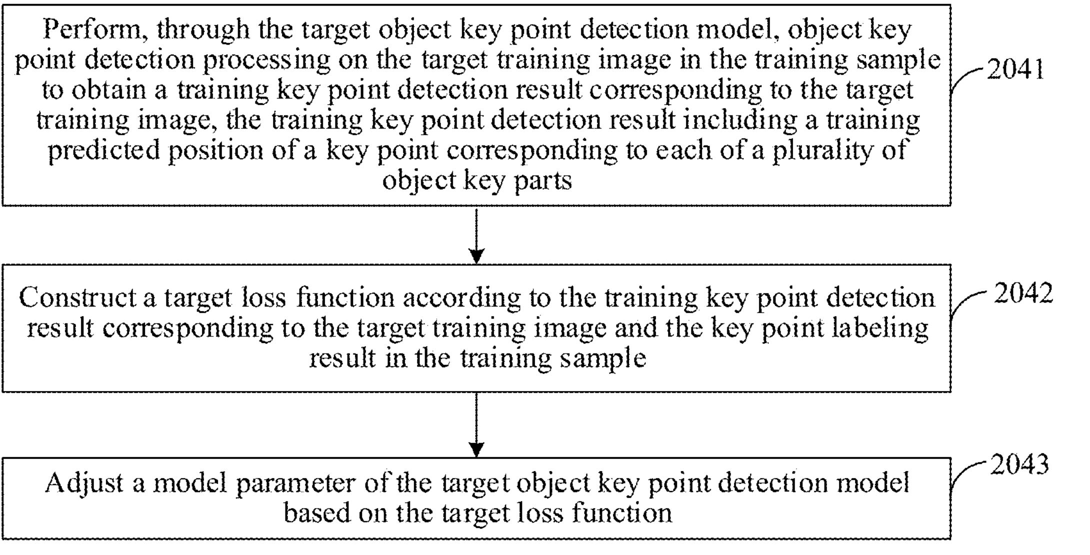
FIG. 4 is schematic diagram of a training process of a target object key point detection model provided by an embodiment of this application.

In a possible implementation, the server may train the target object key point detection model based on the process shown in FIG. 4. As shown in FIG. 4, the server needs to perform the following steps when training the target object key point detection model:

Step 2041: Perform, through the target object key point detection model, object key point detection processing on the target training image in the training sample to obtain a training key point detection result corresponding to the target training image. The training key point detection result includes a training predicted position of a key point corresponding to each of a plurality of object key parts.

When the server specifically trains the object key point detection model by using the training sample, the target training image in the training sample may be input into the target object key point detection model. The target object key point detection model may correspondingly output a training key point detection result corresponding to the target training image by performing analysis processing on the input target training image. The training key point detection result includes a training predicted position of the key point corresponding to each of a plurality of object key parts in the target training image.

It is to be understood that the working principles of the target object key point detection model and the reference object key point detection model mentioned above are basically the same, but there are differences in the model structures of the two. Generally, the structure of the target object key point detection model is simpler than that of the reference object key point detection model. On this basis, the working principle of the target object key point detection model may also be as shown in FIG. 3, that is, a target training image with a size of H×W is input into the target object key point detection model. The target object key point detection model processes the target training image, and the output training key point detection result is a thermodynamic feature map with a size of K×H×W. The $k^{th}$ thermodynamic feature map $y_k$ is used for characterizing the predicted position of a key point corresponding to a $k^{th}$ object key part.

Step 2042: Construct a target loss function according to the training key point detection result corresponding to the target training image and the key point labeling result in the training sample.

After performing the key point detection processing on the target training image by using the target object key point detection model to obtain the training key point detection result corresponding to the target training image, the server may construct the target loss function according to a difference between the training key point detection result and the key point labeling result in the training sample.

In a possible implementation, the server may construct the target loss function in the following manner: for each key point in the training key point detection result, determining whether the object key part corresponding to the key point is the target object key part in the key point labeling result; when the object key part corresponding to the key point is the target object key part in the key point labeling result, constructing, according to a training predicted position corresponding to the key point and a labeling position of the target object key part corresponding to the key point, a loss item corresponding to the key point, and allocating a corresponding first loss weight for the loss item corresponding to the key point; when the object key part corresponding to the key point is not the target object key part in the key point labeling result, constructing, according to a training predicted position corresponding to the key point, a loss item corresponding to the key point, and allocating a corresponding second loss weight for the loss item corresponding to the key point. Here, the first loss weight is greater than 0, and the second loss weight is greater than 0. Then, the target loss function is constructed according to the loss item corresponding to each key point in the training key point detection result and the corresponding loss weight thereof.

According to the content introduced in step 202, it can be known that, when the embodiment of this application determines a key point labeling result corresponding to the target training image, whether each object key part is a target object key part will be determined for each object key part, and the key point labeling result is determined by only determining the labeling position corresponding to the target object key part and by only using the labeling position corresponding to the target object key part. During this process, key points corresponding to some object key parts will be ignored. The key points corresponding to these object key parts may exist actually, but the embodiment of this application considers that the key points corresponding to these object key parts are not reliable through a series of evaluation processing. Therefore, the key points are not added to the key point labeling result corresponding to the target training image. In order to avoid erroneous gradient back propagation and the influence on the performance of the trained target object key point detection model due to the misunderstanding that the key points corresponding to the above object key parts ignored actually do not exist when constructing the target loss function, the embodiment of this application innovatively designs a weighted mean squared error (MSE) loss function as the target loss function.

Specifically, for each key point in the training key point detection result, the server may determine whether the object key part corresponding to the key point is a certain target object key part in the key point labeling result first, that is, determine whether there is a labeling position of the object key part corresponding to the key point in the key point labeling result. When the object key part corresponding to the key point is the target object key part in the key point labeling result, the server may construct, according to a difference between the training predicted position corresponding to the key point and the labeling position of the target object key part corresponding to the key point in the key point labeling result, a loss item corresponding to the key point, and simultaneously, allocate a first loss weight greater than 0 (for example, 1) for the loss item. When the object key part corresponding to the key point is not the target object key part in the key point labeling result, the server may construct, according to a training predicted position corresponding to the key point and a preset reference labeling position (which may be set randomly), a loss item corresponding to the key point, and simultaneously, allocate a second loss weight equal to 0 for the loss item. Then, the server may construct the target loss function according to the loss item corresponding to each key point in the training key point detection result and the corresponding loss weight thereof.

A specific construction formula for the target loss function may be as shown in Formula (1):

$$L_{mse} = \frac{1}{K}\sum_{k=1}^{K} v_{tk} \cdot \left(y_{t,k} - \tilde{y}_{t,k}\right)^2 \tag{1}$$

Where $L_{mse}$ is the constructed target loss function; and K is a total number of object key parts to be detected by a target object key point detection model. $(y_{t,k}-\tilde{y}_{t,k})^2$ is a loss item corresponding to a $k^{th}$ object key part; $y_{t,k}$ is a training predicted position of the key point corresponding to the $k^{th}$ object key part in the training key point detection result; when the key point labeling result includes the labeling position corresponding to the $k^{th}$ object key part, $\tilde{y}_{t,k}$ is the labeling position corresponding to the $k^{th}$ object key part in the key point labeling result; and when the key point labeling result does not include the labeling position corresponding to the $k^{th}$ object key part, $\tilde{y}_{t,k}$ is a randomly set reference labeling position. $v_{t,k}$ is a loss weight corresponding to the above loss item; when the key point labeling result includes the labeling position corresponding to the $k^{th}$ object key part, $v_{t,k}$ is equal to a first loss weight, for example, $v_{t,k}=1$; and when the key point labeling result does not include the labeling position corresponding to the $k^{th}$ object key part, $v_{t,k}$ is equal to a second loss weight, that is, $v_{t,k}=0$.

In some embodiments, when the target training image is the video frame in a target video, the server may also construct a first reference loss function from the perspective of sequential continuity, so as to perform cooperative training on the target object key point detection model based on the above target loss function and the first reference loss function.

That is, the server may determine a video frame that is in the target video and that is adjacent to the target training image as a reference training image, and acquire a training key point detection result corresponding to the reference training image. The training key point detection result corresponding to the reference training image here is obtained by performing object key point detection processing on the reference training image through the target object key point detection model, which includes training predicted positions of the key points respectively corresponding to a plurality of object key parts in the reference training image. Then, the server may construct a first reference loss function according to the training key point detection results respectively corresponding to the target training image and the reference training image.

In an actual application, there will not be a great difference between adjacent video frames in the video, which means that the amplitude of changes of the object key part on an object to be detected in adjacent video frames will not be great. On this basis, the embodiment of this application innovatively designs the first reference loss function used for constraining inter-frame continuity, that is, constructs the first reference loss function for assisting in training the target object key point detection model according to the training key point detection results of the target object key point detection model for two adjacent video frames, so as to constrain, through the first reference loss function, the position of the object key part between frames from changing greatly.

During specific implementation, for each object key part, the server may determine the training predicted position of the key point corresponding to the object key part in the target training image as a third position, determine the training predicted position of the key point corresponding to the object key part in the reference training image as a fourth position, then, construct, according to a distance between the third position and the fourth position, a loss item corresponding to the object key part, and allocate a corresponding loss weight for the loss item. Then, the server may construct the first reference loss function according to the loss item corresponding to each object key part and the loss weight corresponding to the loss item.

Exemplarily, for each object key part, the server may determine the predicted position of the key point corresponding to the object key part in the training key point prediction result corresponding to the target training image as a third position, and determine the predicted position of the key point corresponding to the object key part in the training key point prediction result corresponding to the reference training image as a fourth position. Then, the server may construct, according to a distance between the third position and the fourth position, a loss item corresponding to the object key part, and determine a loss weight corresponding to the loss item according to the distance. For example, if the distance is less than a third preset distance (for example, the third preset distance may be 0.1 in a case of performing normalization processing on each position), it may be determined that the loss weight corresponding to the loss item is equal to 0. If the distance is not less than the third preset distance, it may be determined that the loss weight corresponding to the loss item is equal to 1. Of course, for the two cases that the distance is less than the third preset distance or is not less than the third preset distance, the server may also allocate other loss weights correspondingly, as long as ensuring that the loss weight allocated when the distance is less than the third preset distance is less than the loss weight allocated when the distance is not less than the third preset distance. Then, the server may construct the first reference loss function according to the loss item corresponding to each object key part and the loss weight.

A specific construction formula for the first reference loss function may be as shown in Formula (2):

$$L_{consistency} = \frac{1}{K}\sum_{k=1}^{K} w_k \cdot (y_{t,k} - y_{t-1,k})^2 \tag{2}$$

Where $L_{consistency}$ is the constructed first reference loss function; and K is a total number of object key parts to be detected by a target object key point detection model. $(y_{t,k}-y_{t-1,k})^2$ is a loss item corresponding to a $k^{th}$ object key part; $y_{t,k}$ is the training predicted position of the key point corresponding to a $k^{th}$ object key part in the training key point detection result corresponding to the target training image, and $y_{t-1,k}$ is the training predicted position of the key point corresponding to the $k^{th}$ object key part in the training key point detection result corresponding to the reference training image; $w_k$ is a loss weight corresponding to the above loss item; for example, $w_k$ may be equal to 0 when the distance between $y_{t,k}$ and $y_{t-1,k}$ is less than the third preset distance; and for example, $w_k$ may be equal to 1 when the distance between $y_{t,k}$ and $y_{t-1,k}$ is not less than the third preset distance.

Thus, in the above manner, the first reference loss function used for constraining inter-frame continuity is introduced, which helps to make the trained target object key point detection model converge quickly, improve the model training efficiency, and improve the model performance of the trained target object key point detection model.

In some embodiments, the embodiment of this application may also introduce an idea of knowledge distillation into a training process for the target object key point detection model, so as to further improve the model performance of the trained target object key point detection model. Knowledge distillation is a model training manner of guiding a simple model (also referred to as a student model) by using the knowledge leaned by a complex model (as referred to as a teacher model), which aims to make the simple model have comparable performance to the complex model. Moreover, the quantity of parameters of the simple model is greatly reduced compared with that of the complex model, thereby realizing compression and acceleration of a model.

That is, the server may acquire a first intermediate processing result generated when a certain reference object key point detection model processes a target training image, and acquire a second intermediate processing result generated when a target object key point detection model processes the target training image. Then, a second reference loss function is constructed according to the first intermediate processing result and the second intermediate processing result.

Exemplarily, the server may select a reference object key point detection model that has a model structure close to that of the trained target object key point detection model from the m reference object key point detection models as a teacher model, and then, acquire an intermediate processing result generated when the teacher model processes a target training image as a first intermediate processing result, for example, acquiring, when the teacher model processes a target training image, a feature extracted by a certain feature extraction layer from the target training image as the first intermediate processing result. When the target training image is processed by using the target object key point detection model, the server may acquire an intermediate processing result generated when the target object key point detection model processes the target training image as a second intermediate processing result, for example, acquiring, when the target object key point detection model processes the target training image, a feature extracted by a certain feature extraction layer from the target training image as the second intermediate processing result. The first intermediate processing result and the second intermediate processing result acquired herein have the same dimension, and are from the same processing stage, for example, the first intermediate processing result and the second intermediate processing result are respectively from encoding stages of the reference object key point detection model and the target object key point detection model, and/or the first intermediate processing result and the second intermediate processing result are respectively from decoding stages of the reference object key point detection model and the target object key point detection model. No limits are made to the first intermediate processing result and the second intermediate processing result in the embodiment of this application.

After acquiring the first intermediate processing result and the second intermediate processing result, the server may construct a second reference loss function according to a difference between the first intermediate processing result and the second intermediate processing result. When the target object key point detection model is trained based on the second reference loss function, a model parameter of the target object key point detection model to be trained may be adjusted by taking the minimization of the second loss function as a training objective.

Thus, by the above manner, the second reference loss function constructed based on the idea of knowledge distillation is introduced, and the training of the target object key point detection model is guided by using the reference object key point detection model with higher model performance, which helps to improve the model performance of the target object key point detection model, helps to make the trained target object key point detection model converge quickly, and improves the model training efficiency.

Step 2043: Adjust a model parameter of the target object key point detection model based on the target loss function.

After constructing the target loss function used for training the target object key point detection model through step 2042, the server may adjust the model parameter of the target object key point detection model by taking the minimization of the target loss function as a training objective, so that the target object key point detection model tends to converge.

It is to be understood that the server may adjust the model parameter of the target object key point detection model based on the target loss function and the first reference loss function when the server also introduces the first reference loss function used for constraining the inter-frame continuity.

Specifically, the server may construct a total loss function in a model training stage according to the target loss function and the first reference loss function through the following Formula (3):

$$L = L_{mse} + \lambda \cdot L_{consistency} \tag{3}$$

Where L is the total loss function in the model training stage, $L_{mse}$ is the target loss function, $L_{consistency}$ is the first reference loss function, and $\lambda$ is a weight allocated for the first reference loss function in advance.

Then, the model parameter of the target object key point detection model is adjusted by taking the minimization of the target loss function as a training objective, so that the target object key point detection model tends to converge.

It is to be understood that the server may adjust the model parameter of the target object key point detection model based on the target loss function and the second reference loss function when the server also introduces the second reference loss function constructed based on the idea of knowledge distillation.

Specifically, the server may construct the total loss function in the model training stage according to the target loss function and the second reference loss function in a similar manner of constructing the total loss function according the target loss function and the first reference loss function hereinbefore. Then, the model parameter of the target object key point detection model is adjusted by taking the minimization of the target loss function as a training objective, so that the target object key point detection model tends to converge.

It is to be understood that the server may adjust the model parameter of the target object key point detection model based on the target loss function, the first reference loss function, and the second reference loss function when the server introduces the first reference loss function and the second reference loss function at the same time. That is, the server may allocate corresponding weights for the first reference loss function and the second reference loss function, then construct the total loss function in the model training stage according to the target loss function, the first reference loss function and the weight corresponding thereto, the second reference loss function and the weight corresponding thereto, and adjust the model parameter of the target object key point detection model by taking the minimization of the target loss function as a training model, so that the target object key point detection model tends to converge.

The server repeatedly perform the above step 2041 to step 2043 based on different target training images to realize iterative training for the target object key point detection model until the target object key point detection model satisfies a model training ending condition. The trained target object key point detection model at this moment may be the target object key point detection model that is actually put into use. The training ending condition here, for example, may be that the model performance of the trained target object key point detection model meets a preset requirement (for example, the detection accuracy of the target object key point detection model reaches a preset accuracy threshold), for another example, may be that the model performance of the target object key point detection model is not improved significantly (for example, the target object key point detection models obtained by several rounds of training are tested by using a test sample set to determine that a difference in detection accuracy between every two target object key point detection models obtained by the several rounds of training is less than a preset difference threshold), and for still another example, may be that the number of times of iterative training for the target object key point detection model reaches a preset number of times. No limits are made to the training ending condition in the embodiment of this application.

When the above model training method generates the training sample used for training the object key point detection model that needs to be actually put into use, object key point detection processing will be performed on the target training image through a plurality of reference object key point detection models with complex structures to obtain a plurality of key point detection results. Then, based on the principle that the predicted positions of the same object key part in various key point detection results are basically consistent, for each object key part, whether a position prediction result of each reference object key point detection model for the object key part is reliable is measured according to the predicted position of the key point corresponding to the object key part in each key point detection result, that is, whether the object key part is the target object key part is determined. When it is determined that the position prediction result of each reference object key point detection model for the object key part is reliable, the labeling position corresponding to the target object key part is further determined as a pseudo label. Then, a training sample is formed by using the target training image and the labeling position corresponding to each target object key part. Thus, the object key part with an unreliable position prediction result is ignored, and only the labeling position corresponding to the object key part with a reliable position prediction result is used the pseudo label, which can effectively reduce the noise in the determined pseudo label, and improve the accuracy of the pseudo label. Correspondingly, the performance of a trained target object key point detection model can be ensured to a certain extent by training the target object key point detection model that needs to be actually put into use and has a complex structure based on the training sample including the pseudo label.

In order to facilitate further understanding of the model training method provided by the embodiment of this application, the model training method is exemplarily introduced below on the whole by taking an example in which a human body key point detection model used for detecting a posture of a player in a motion sensing game is trained by the model training method.

Figure 5:
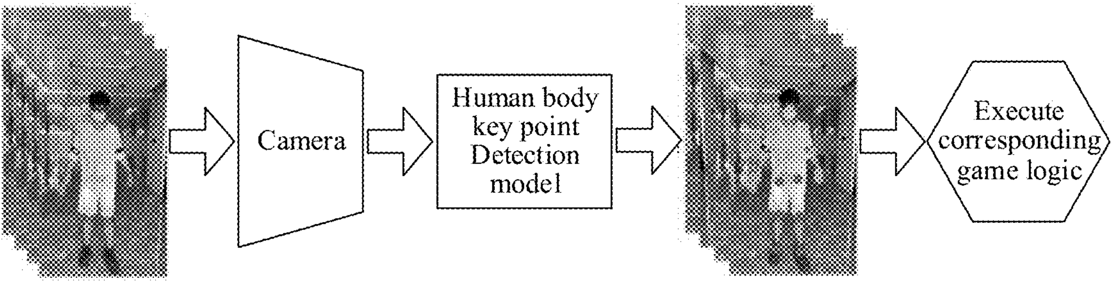
FIG. 5 is an architectural diagram of overall implementation of a motion sensing game provided by an embodiment of this application.

The motion sensing game refers to a game that uses a body to feel, which breaks through the traditional operation manner of simply inputting with joystick buttons. The motion sensing game is a novel electronic game that operates through changes in body movement. In a process of the motion sensing game, a camera may shoot an image including the body of the player, and transmit the shot image to a game server in a background. A game server detects the positions of important joint points of skeletons of the player in the image through the human body key point detection model, recognizes body movement of the player accordingly, and then executes corresponding game logic. FIG. 5 is an architectural diagram of overall implementation of the above motion sensing game.

Figure 6:
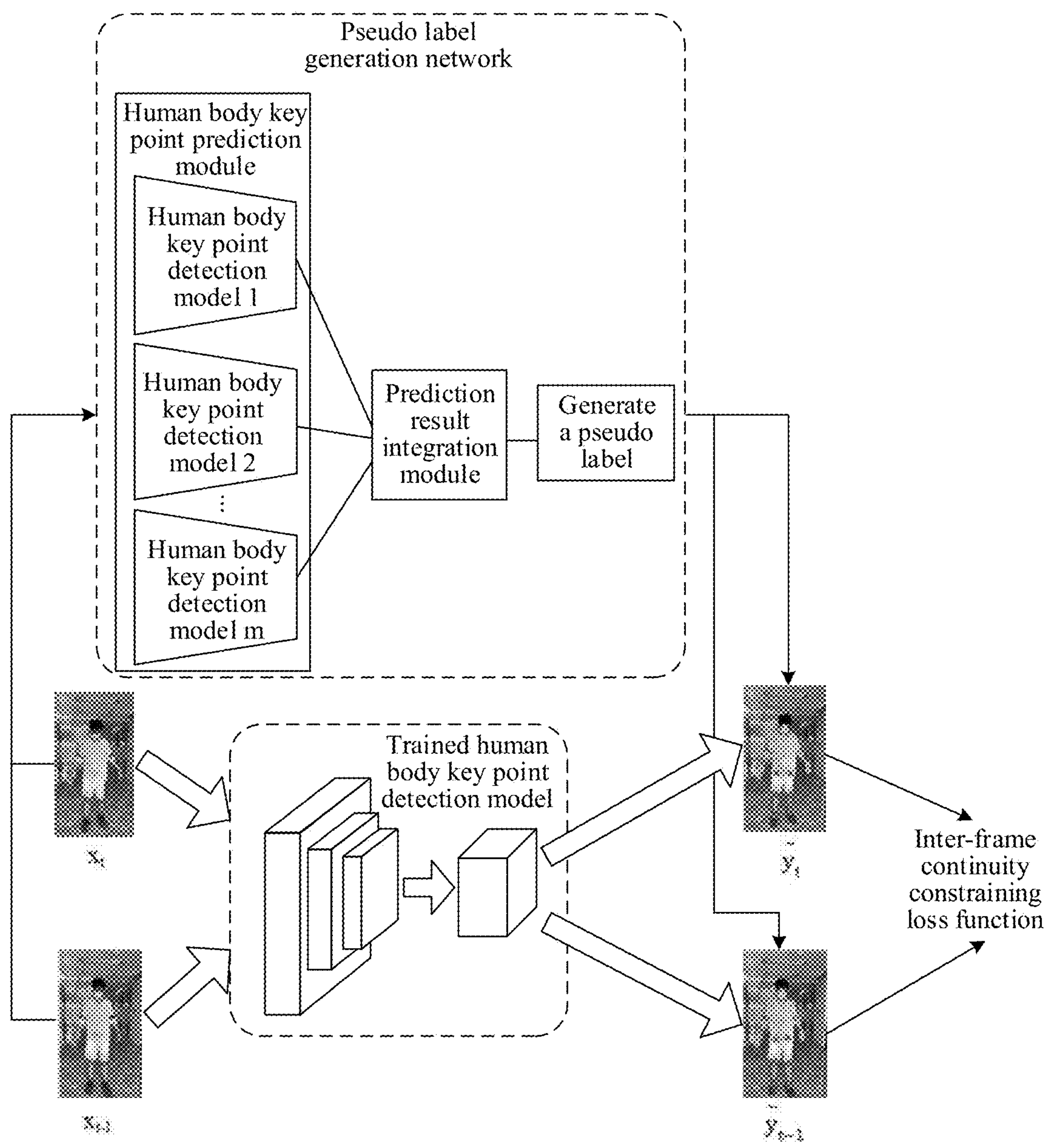
FIG. 6 is a schematic diagram of training architecture of a human body key point detection model applied to a motion sensing game provided by an embodiment of the application.

FIG. 6 is a schematic diagram of training architecture of a human body key point detection model applied to the above motion sensing game provided by an embodiment of the application. As shown in FIG. 6, in a model training process, for any section of video that is not labeled and include a clear and complete human body, a server may select two adjacent video frames $x_{t-1}$ and $x_t$ therefrom, and then generate pseudo labels and $\tilde{y}_{t-1}$ and $\tilde{y}_t$ respectively corresponding to the two video frames through a pseudo label generation network. Then, human body key point detection processing is performed on the two video frames through the human body key point detection model that needs to be trained to obtain thermodynamic feature maps respectively corresponding to the two video frames. A training objective of the model training process is to make the two thermodynamic feature maps correspond to the corresponding pseudo labels. In addition, the embodiment of this application also designs a specific loss function based on the inter-frame continuity between $\tilde{y}_{t-1}$ and $\tilde{y}_t$, so that the model can realize self-supervised learning. In a test or application stage, it only requires to input a picture or a video into the trained human body key point detection model, and the pseudo label generation network only exists in the model training stage.

The technical solutions provided by the embodiments of this application mainly include two core modules: One is a pseudo label generation network, which performs human body key point detection on a video frame in an unlabeled video by using a plurality of existing human body key point detection models with complex structures and high performance, then generates a pseudo label corresponding to the video frame based on the detection result of each human body key point detection model, and uses the pseudo label in a subsequent training process. The other is an inter-frame continuity constraining loss function, which designs an inter-frame continuity loss function based on a priori condition that the amplitude of changes of character movement between video frames will not be great, so that the model can realize unsupervised learning.

The two core modules are respectively introduced in detail below.

As shown in FIG. 6, the pseudo label generation network includes a human body key point prediction module and a prediction result integration module.

The human body key point prediction module includes a plurality $\tilde{y}_t$ of existing human body key point detection models with complex structures and high performance. When the human body key point prediction module includes m (m is an integer greater than 1) human body key point detection models, assuming that one picture $x_t$ is input, prediction results $\tilde{y}_t=[\tilde{y}_1, \tilde{y}_2, \ldots, \tilde{y}_m]$ respectively corresponding to the m human body key point detection models will be obtained by performing human body key point detection processing on the picture through the m human body key point detection models.

The prediction result integration module is configured to complete the integration of m prediction results through the following steps. In a process of integrating, strict filtering processing is performed on the prediction results in both a spatial dimension and a temporal dimension according to the embodiment of this application, so as to ensure that the generated pseudo label has higher accuracy. A specific integrating method is as follows:

(1) For each prediction result, key points corresponding to a confidence less than 0.5 are ignored. Specifically, a prediction result includes a confidence that each pixel in a picture $x_{t-1}$ belongs to human body key points. For the pixel corresponding to the confidence less than 0.5, it may be considered that the pixel does not belong to a human body key point by default in the embodiment of this application. Therefore, the pixel may be ignored.

(2) From a spatial perspective, for a key point corresponding to a certain human body part, a server may calculate a mean value of predicted coordinates of the key point corresponding to the human body part in the m prediction results as reference coordinates corresponding to the human body part. Then, whether the prediction result belongs to a qualified prediction result corresponding to the human body part may be determined based on a distance between the predicted coordinates of the key point corresponding to the human body part in each prediction result and the reference coordinates. Specifically, it may be considered that the prediction result belongs to the qualified prediction result corresponding to the human body part when the distance between the predicted coordinates of the key point corresponding to the human body part in the prediction result and the reference coordinates is less than 0.1 (after normalization processing). It may be considered that the prediction result does not belong to the qualified prediction result corresponding to the human body part when the distance between the predicted coordinates of the key point corresponding to the human body part in the prediction result and the reference coordinates is not less than 0.1. When a quantity of qualified prediction results corresponding to the human body part is greater than or equal to m/2, the server may determine that the human body part belongs to a valid human body part, and average the predicted coordinates of the key point corresponding to the valid human body part in the qualified prediction results corresponding to the valid human body part to obtain labeling coordinates corresponding to the valid human body part. When a quantity of qualified prediction results corresponding to the human body part is less than m/2, the server may determine that the human body part belongs to an invalid human body part, ignore the invalid human body part, and not determine corresponding labeling coordinates thereof. Then, the server may form a pseudo label $\tilde{y}_t$ corresponding to the picture $x_t$ by using the labeling coordinates corresponding to each valid human body part.

(3) From a temporal perspective, the server may also acquire a video frame $x_{t-1}$ that is in video frame and that is adjacent to the picture $x_t$ when the picture $x_t$ is one video frame in a certain video. Then, further screening processing is performed on the labeling coordinates included in the two pseudo labels $\tilde{y}_t$ and $\tilde{y}_{t-1}$ according to the pseudo labels $\tilde{y}_t$ and $\tilde{y}_{t-1}$ respectively corresponding to the two video frames. Specifically, $\tilde{y}_{t,k}$ in the pseudo label $\tilde{y}_t$ and $\tilde{y}_{t-1,k}$ in the pseudo label $\tilde{y}_{t-l}$ may be ignored when the distance between the labeling coordinates $\tilde{y}_{t,k}$ corresponding to the $k^{th}$ human body part in the pseudo label $\tilde{y}_t$ and the labeling coordinates $\tilde{y}_{t-1,k}$ corresponding to the $k^{th}$ human body part in the pseudo label $\tilde{y}_{t-1}$ exceeds 0.2 (after normalization processing).

(4) After the above filtering processing in the spatial dimension and the temporal dimension, a pseudo label with high accuracy may be acquired. However, there will be many ignored human body parts through the above processing, these human body parts exist actually. However, it is considered that the detection results of the human body key point detection model for the human body parts are not reliable in the embodiment of this application, so they are not put into a subsequent model training process. If the model is directly trained based on an MSE loss function, it will be mistakenly considered that these key points do not exist actually to cause gradient back propagation erroneously, thereby affecting the performance of the trained human body key point detection model. In order to solve this problem, the embodiment of this application designs a weighted MSE loss function. When the human body part in the pseudo label is ignored, the loss weight of the loss item corresponding to the human body part is set as 0. In this way, erroneous back propagation may be prevented. The following formula is the weighted MSE loss function provided by the embodiment of this application:

$$L_{mse} = \frac{1}{K}\sum_{k=1}^{K} v_{tk} \cdot (y_{t,k} - \tilde{y}_{t,k})^2$$

Where $L_{mse}$ is the constructed loss function; and K is a total number of human body parts to be detected by a human body key point detection model. $(y_{t,k}-\tilde{y}_{t,k})^2$ is a loss item corresponding to a $k^{th}$ human body part; $y_{t,k}$ is a predicted position of the human body key point detection model to be trained for the $k^{th}$ human body part; when the pseudo label $\tilde{y}_t$ includes the labeling position corresponding to the $k^{th}$ object key part, $\tilde{y}_{t,k}$ is the labeling position corresponding to the $k^{th}$ object key part in the pseudo label $\tilde{y}_t$. When the pseudo label $\tilde{y}_t$ does not include the labeling position corresponding to the $k^{th}$ object key part, $\tilde{y}_{t,k}$ is a randomly set reference labeling position. $v_{t,k}$ is a loss weight corresponding to the above loss item; when the pseudo label $\tilde{y}_t$ includes the labeling position corresponding to the $k^{th}$ object key part, $v_{t,k}=1$; and when the pseudo label $\tilde{y}_t$ does not include the labeling position corresponding to the $k^{th}$ object key part, $v_{t,k}=0$.

In addition, the embodiment of this application discovers that there will not be a great difference between a previous video frame and a next video frame that are adjacent two each other in a video, that is, the amplitude of changes of the human body parts in adjacent video frames will not be great. Based on this priori knowledge, this application also designs an inter-frame continuity constraint function, which is used for realizing unsupervised learning for the human body key point detection model, so as to ensure that the jump amplitude of the coordinates of the key point between frames will not be great when the human body key point detection model predicts the video. The loss function is specifically as follows:

$$L_{consistency} = \frac{1}{K}\sum_{k=1}^{K} w_k \cdot (y_{t,k} - y_{t-1,k})^2$$

Where $L_{consistency}$ is an inter-frame continuity constraining function; K is a total number of human body parts to be detected by a human body key point detection model. $(y_{t,k}-y_{t-1,k})^2$ is a loss item corresponding to a $k^{th}$ human body part; $y_{t,k}$ is a training predicted position of the key point corresponding to a $k^{th}$ object key part in the training prediction result corresponding to a $t^{th}$ video frame, and $y_{t-1,k}$ is a training predicted position of the key point corresponding to the $k^{th}$ object key part in the training prediction result corresponding to the $(t-1)^{th}$ video frame; $w_k$ is a loss weight corresponding to the above loss item; when the distance between $y_{t,k}$ and $y_{t-1,k}$ is less than 0.1 (after normalization processing), $w_k=0$; and when the distance between $y_{t,k}$ and $y_{t-1,k}$ is less than 0.1 (after normalization processing), $w_k=1$.

In conclusion, the total loss function in the training stage in the solution provided by the embodiment of this application is as follows:

$$L = L_{mse} + \lambda \cdot L_{consistency}$$

Where $\lambda$ is a weight allocated for $L_{consistency}$ in advance. Then, the server may train the human body key point detection model to be trained based on the loss function L.

The human body key point detection model obtained in the above manner is tested by using a COCO-wholebody human body key point detection public test set. The mean average precision (mAP) index of all categories is increased from 0.457 to 0.521.

Figure 7:
FIG. 7 is a schematic diagram of a test result of a human body key point detection model provided by an embodiment of the application.
Figure 7:
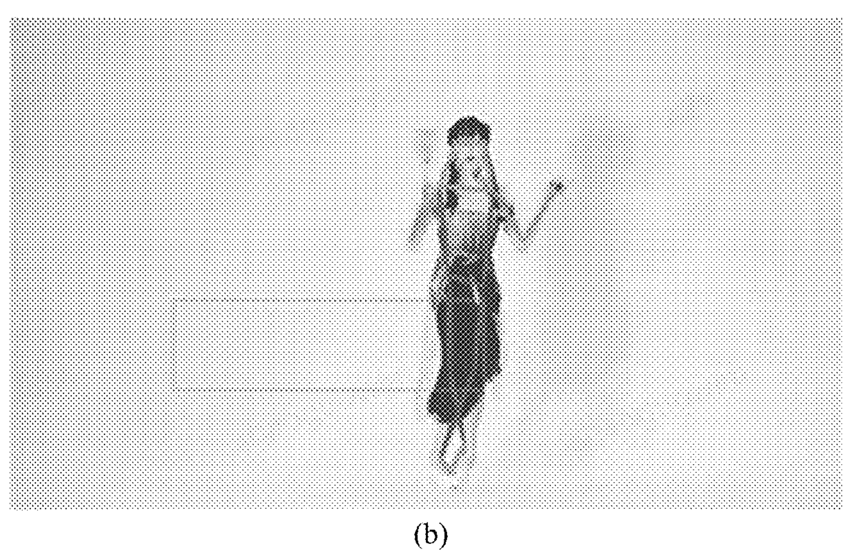

The inventor of this application also performs a comparison test on the human body key point detection model applied to the motion sensing game at present and the human body key point detection model trained in the above manner. A result of the comparison test is as shown in FIG. 7, (a) is a detection result determined by the human body key point detection model trained by the solution provided by the embodiment of this application, (b) is a detection result determined through the existing human body key point detection model. It may be found through comparison that (a) is more accurate than (b), key points corresponding to a left foot and a right food in (a) are not transposed, while key points corresponding to a left foot and a right food in (b) are transposed.

It is to be understood that the model training method provided by the embodiment of this application may also be used for training an object key point detection model in other scenarios in addition to training a human body key point detection model in a motion sensing game scenario, for example, a function used for adding a special effect to a human body or an animal in a video shooting scenario often requires an object key point detection model to detect a key point of an object in an image. The solution provided by the embodiment of this application may also be used for training the object key point detection model in this scenario. No limits are made to the application scenario to which the solution provided by the embodiment of this application is applicable.

It is to be understood that, in a specific implementation of this application, relevant data such as user information (for example, an image shot by a camera) is involved. When the above embodiments of this application are applied to a specific product or technology, user permission or consent needs to be acquired, and the collection, use, and processing of the relevant data need to comply with relevant laws, regulations, and standards of relevant countries and regions.

For the model training method described above, this application further provides a corresponding model training apparatus, so that the above model training method is applied and implemented in practice.

Figure 8:
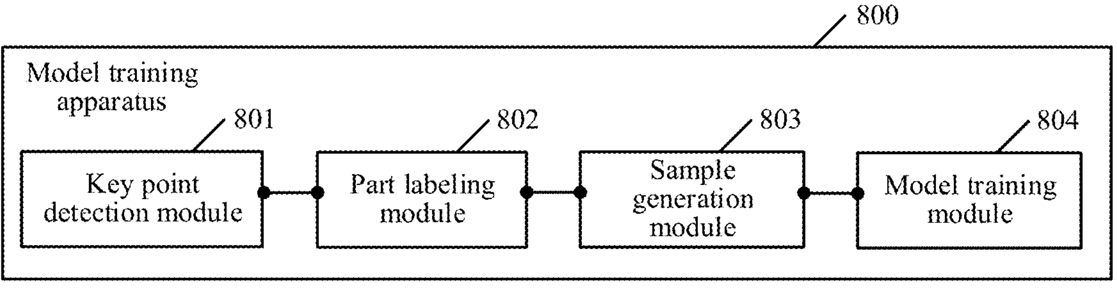
FIG. 8 is a schematic structural diagram of a model training apparatus provided by an embodiment of this application.

Refer to FIG. 8, which is a schematic structural diagram of a model training apparatus 800 corresponding to the model training method as shown in FIG. 2 described above. As shown in FIG. 8, the model training apparatus 800 includes:

- a key point detection module 801, configured to respectively perform, through m reference object key point detection models, object key point detection processing on a target training image to obtain key point detection results respectively corresponding to the m reference object key point detection models, the key point detection result includes a predicted position of a key point corresponding to each of a plurality of object key parts in the target training image. M being an integer greater than 1;
- a part labeling module 802, configured to: for each object key part, determine, according to a predicted position of a key point corresponding to the object key part in the m key point detection results, whether the object key part is a target object key part, and when the object key part is the target object key part, determine, according to the predicted position of the key point corresponding to the target object key part in the m key point detection results, a labeling position corresponding to the target object key part;
- a sample generation module 803, configured to take the target training image and a key point labeling result corresponding thereto as a training sample, the key point labeling result including the labeling position corresponding to each target object key part; and
- a model training module 804, configured to train the target object key point detection model based on the training sample.

In some embodiments, on the basis of the model training apparatus shown in FIG. 8, the part labeling module 802 is specifically configured to:

- determine, according to the predicted position of the key point corresponding to the object key part in the m key point detection results, a reference position corresponding the object key part;
- for each key point detection result, determine a distance between the predicted position of the key point corresponding to the object key part and a reference position corresponding to the object key part, and determine, according to the distance, whether the key point detection result belongs to a target key point detection result corresponding to the object key part;
- count a target quantity of target key point detection results corresponding to the object key parts in the m key point detection results;
- determine, when the target quantity exceeds a preset quantity, the object key part as the target object key part; or determine, when the target quantity does not exceed a preset quantity, the object key part as an invalid target object key part.

In some embodiments, on the basis of the model training apparatus shown in FIG. 8, the part labeling module 802 is specifically configured to:

- for each key point detection result corresponding to the target object key part, determine predicted position of the key point corresponding to the target object key part as a target predicted position corresponding the target object key part; and
- determine, according to each target predicted position corresponding to the target object key part, the labeling position corresponding to the target object key part.

Figure 9:
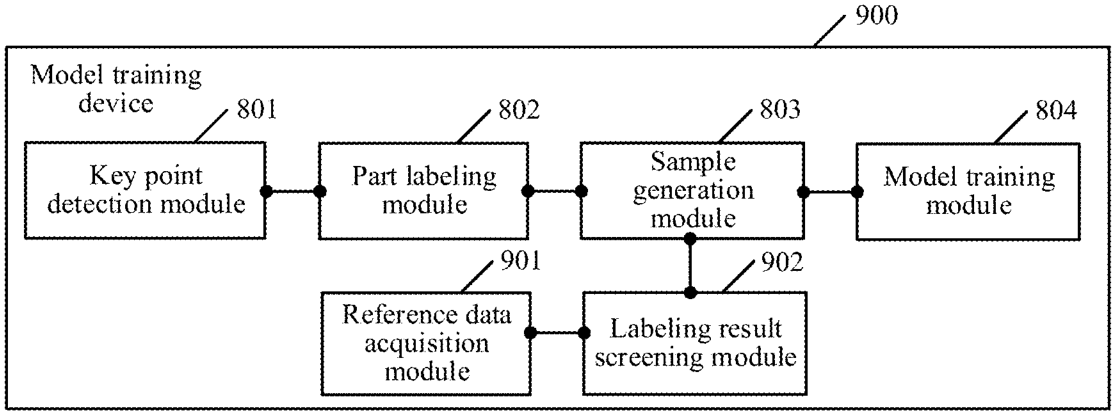
FIG. 9 is a schematic structural diagram of another model training apparatus provided by an embodiment of this application.

In some embodiments, on the basis of the model training apparatus shown in FIG. 8, refer to FIG. 9, which is a schematic structural diagram of another model training apparatus 900 provided by an embodiment of this application. As shown in FIG. 9, when the target training image is a video frame in a target video, the apparatus further includes:

- a reference data acquisition module 901, configured to determine a video frame that is in the target video and that is adjacent to the target training image as a reference training image, and acquire a key point labeling result corresponding to the reference training image; and
- a labeling result screening module 902, configured to: for each target object key part, determine a labeling position of the target object key part in the key point labeling result corresponding to the target training image as a first position, determine a labeling position of the target object key part in the key point labeling result corresponding to the reference training image as a second position, and determine, according to a distance between the first position and the second position, whether to reserve the first position in the key point labeling result corresponding to the target training image and whether to reserve the second position in the key point labeling result corresponding to the reference training image.

In some embodiments, on the basis of the model training apparatus shown in FIG. 8, the key point detection module 801 is specifically configured to:

- for each reference object key point detection model, perform, through the reference object key point detection model, object key point detection processing on the target training image, and determine a confidence that each pixel in the target training image belongs to the object key part; and
- determine, according to the pixel with the confidence that the pixel belongs to the object key part in the target training image greater than a preset confidence, the key point detection result corresponding to the reference object key point detection model.

Figures 10, 11:
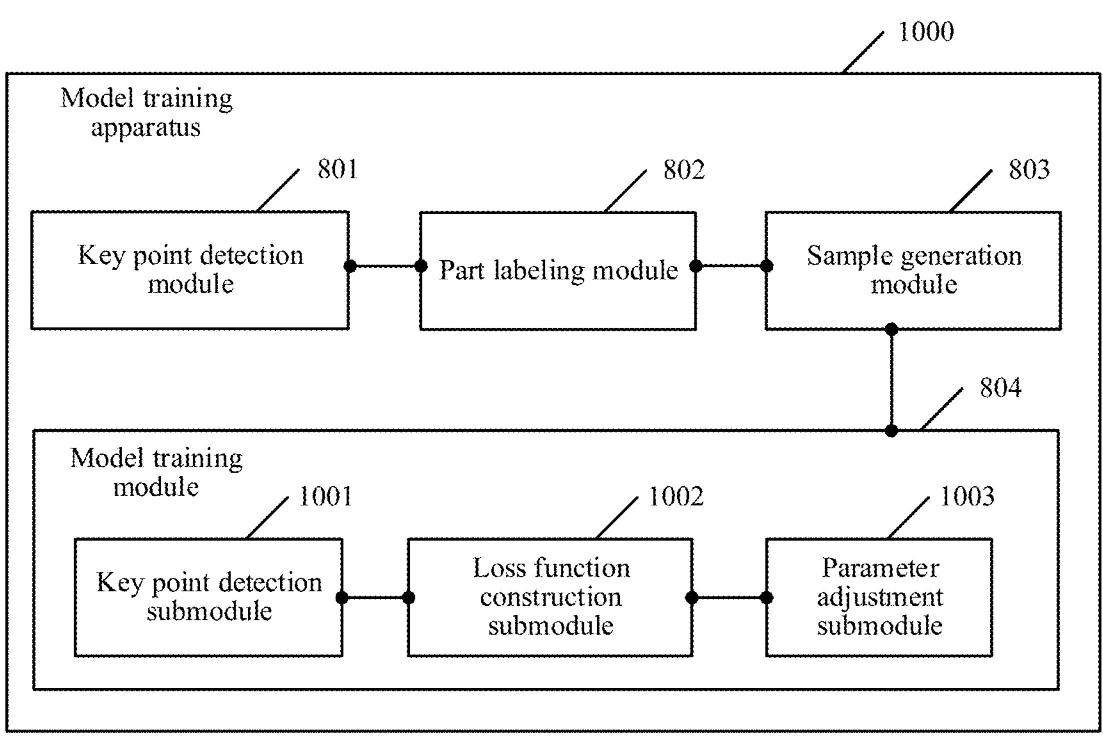
FIG. 10 is a schematic structural diagram of still another model training apparatus provided by an embodiment of this application.
FIG. 11 is a schematic structural diagram of a terminal device provided by an embodiment of this application.

In some embodiments, on the basis of the model training apparatus shown in FIG. 8, refer to FIG. 10, which is a schematic structural diagram of another model training apparatus 1000 provided by an embodiment of this application. As shown in FIG. 10, the model training module 804 includes:

a key point detection submodule 1001, configured to perform, through the target object key point detection model, object key point detection processing on the target training image in the training sample to obtain a training key point detection result corresponding to the target training image, the training key point detection result including a training predicted position of a key point corresponding to each of a plurality of object key parts;

a loss function construction submodule 1002, configured to construct a target loss function according to the training key point detection result corresponding to the target training image and the key point labeling result in the training sample; and a parameter adjustment submodule 1003, configured to adjust a model parameter of the target object key point detection model based on the target loss function.

In some embodiments, on the basis of the model training apparatus shown in FIG. 10, the loss function construction submodule 1002 is specifically configured to:

for each key point in the training key point detection result, determine whether the object key part corresponding to the key point is the target object key part in the key point labeling result; when the object key part corresponding to the key point is the target object key part in the key point labeling result, construct, according to a training predicted position corresponding to the key point and a labeling position of the target object key part corresponding to the key point, a loss item corresponding to the key point, and allocate a corresponding first loss weight for the loss item corresponding to the key point; when the object key part corresponding to the key point is not the target object key part in the key point labeling result, construct, according to a training predicted position corresponding to the key point, a loss item corresponding to the key point, and allocate a corresponding second loss weight for the loss item corresponding to the key point, the first loss weight being greater than 0, and the second loss weight being greater than 0; and construct, according to the loss item corresponding to each key point in the training key point detection result and the loss weight corresponding to the loss item, the target loss function.

In some embodiments, on the basis of the model training apparatus shown in FIG. 10, the loss function construction submodule 1002 is further configured to:

determine a video frame that is in the target video and that is adjacent to the target training image as a reference training image, acquire a training key point detection result corresponding to the reference training image, and construct a first reference loss function according to the training key point detection results respectively corresponding to the target training image and the reference training image; and then the parameter adjustment submodule 1003 is specifically configured to:

adjust, based on the target loss function and the first reference loss function, the model parameter of the target object key point detection model.

In some embodiments, the loss function construction submodule 1002 is specifically configured to:

for each object key part, determine the training predicted position of the key point corresponding to the object key part in the target training image as a third position, and determine the training predicted position of the key point corresponding to the object key part in the reference training image as a fourth position; construct, according to a distance between the third position and the fourth position, a loss item corresponding to the object key part, and allocate a corresponding loss weight for the loss item; and construct the first reference loss function according to the loss item corresponding to each object key part and the loss weight corresponding to the loss item.

In some embodiments, on the basis of the model training apparatus shown in FIG. 10, the loss function construction submodule 1002 is specifically configured to:

acquire a first intermediate processing result generated when the reference object key point detection model processes the target training image; acquire a second intermediate processing result generated when the target object key point detection model processes the target training image;

construct a second reference loss function according to the first intermediate processing result and the second intermediate processing result; and then the parameter adjustment submodule 1003 is specifically configured to:

adjust, based on the target loss function and the second reference loss function, the model parameter of the target object key point detection model.

When the above model training apparatus generates the training sample used for training the object key point detection model that needs to be actually put into use, object key point detection processing will be performed on the target training image through a plurality of reference object key point detection models with complex structures to obtain a plurality of key point detection results. Then, based on the principle that the predicted positions of the same object key part in various key point detection results are basically consistent, for each object key part, whether a position prediction result of each reference object key point detection model for the object key part is reliable is measured according to the predicted position of the key point corresponding to the object key part in each key point detection result, that is, whether the object key part is the target object key part is determined. When it is determined that the position prediction result of each reference object key point detection model for the object key part is reliable, the labeling position corresponding to the target object key part is further determined as a pseudo label. Then, a training sample is formed by using the target training image and the labeling position corresponding to each target object key part. Thus, the object key part with an unreliable position prediction result is ignored, and only the labeling position corresponding to the object key part with a reliable position prediction result is used the pseudo label, which can effectively reduce the noise in the determined pseudo label, and improve the accuracy of the pseudo label. Correspondingly, the performance of a trained target object key point detection model can be ensured to a certain extent by training the target object key point detection model that needs to be actually put into use and has a complex structure based on the training sample including the pseudo label.

The embodiment of this application further provides a computer used for training a model. The computer device may specifically be a terminal device or a server. The terminal device and the server provided by the embodiment of this application will be introduced below from the perspective of hardware materialization.

Refer to FIG. 11, which is a schematic structural diagram of a terminal device according to an embodiment of this application. As shown in FIG. 11, in order to facilitate describing, only parts related to the embodiments of this application are shown. For specific technical details that are not disclosed, refer to the method part in the embodiments of this application. The terminal device may be any terminal device such as a mobile phone, a tablet computer, a PDA, a point of sales (POS), and an on-board computer, the terminal being a computer as an example:

FIG. 11 is a block diagram of a partial structure of the computer related to the terminal according to an embodiment of this application. Referring to FIG. 11, the computer includes: components such as a radio frequency (RF) circuit 1110, a memory 1120, an input unit 1130 (including a touch panel 1131 and other input devices 1132), a display unit 1140 (including a display panel 1141), a sensor 1150, an audio circuit 1160 (capable of being connected to a loudspeaker 1161 and a microphone 1162), a wireless fidelity (Wi-Fi) module 1170, a processor 1180, and a power supply 1190. A person of skill in the art may understand that, a structure of the computer shown in FIG. 11 does not constitute a limit to the computer, and may include components that are more or fewer than those shown in the figure, or a combination of some components, or different component arrangements.

The memory 1120 may be configured to store a software program and module. The processor 1180 runs the software program and module stored in the memory 1120, to implement various functional applications and data processing of the computer. The memory 1120 may mainly include a program storage area and a data storage area. The program storage area may store an operating system, an application required by at least one function (for example, a sound playing function and an image playing function), or the like. The data storage area may store data (for example, audio data and a phone book) created according to use of the computer. In addition, the memory 1120 may include a high-speed random access memory (RAM), and may further include a non-volatile memory such as a disk storage device, a flash device, or other non-volatile solid storage devices.

The processor 1180 is a control center of the computer, and connects to various parts of the entire computer by using various interfaces and lines. By running or executing software programs and/or modules stored in the memory 1120, and invoking data stored in the memory 1120, various functions and data processing of the computer are performed, thereby performing overall monitoring on the computer. In some embodiments, the processor 1180 may include one or more processing units. Preferably, the processor 1180 may integrate an application processor and a modem. The application processor mainly processes an operating system, a user interface, an application, and the like. The modem mainly processes wireless communication. It may be understood that the above modem may either not be integrated into the processor 1180.

In the embodiment of this application, the processor 1180 included in the terminal further has the following functions:

- respectively performing, through m reference object key point detection models, object key point detection processing on a target training image to obtain key point detection results respectively corresponding to the m reference object key point detection models, the key point detection result including a predicted position of a key point corresponding to each of a plurality of object key parts in a target training image, and M being an integer greater than 1;
- for each object key part, determining, according to a predicted position of a key point corresponding to the object key part in the m key point detection results, whether the object key part is a target object key part; when the object key part is the target object key part, determining, according to the predicted position of the key point corresponding to the target object key part in the m key point detection results, a labeling position corresponding to the target object key part;
- taking the target training image and a key point labeling result corresponding thereto as a training sample, the key point labeling result including the labeling position corresponding to each target object key part; and
- training the target object key point detection model based on the training sample.

Figure 12:
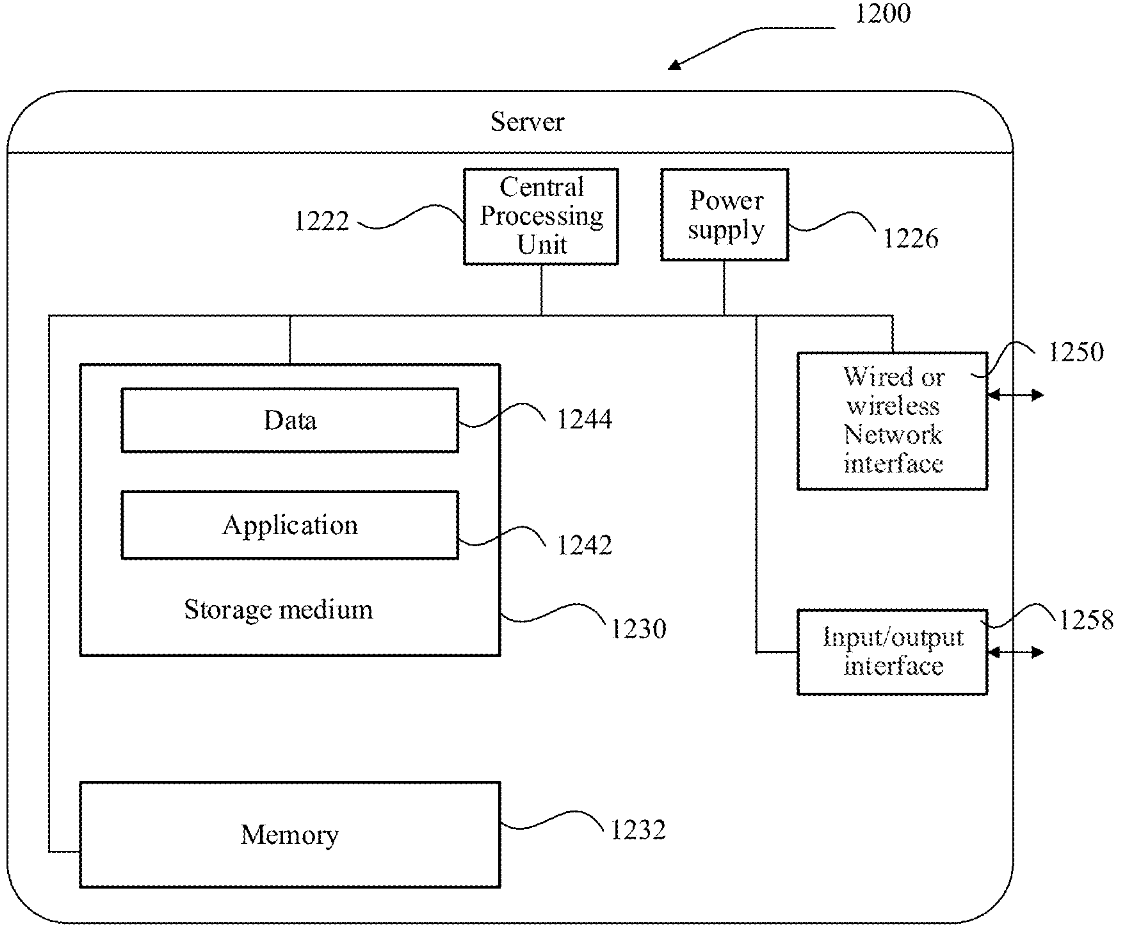
FIG. 12 is a schematic structural diagram of a server provided by an embodiment of this application.

In some embodiments, the processor 1180 is further configured to perform the steps of any implementation of the model training method provided by the embodiments of this application Refer to FIG. 12, which is a schematic structural diagram of a server 1200 provided by an embodiment of this application. The server 1200 may greatly differ as configuration or performance differs, may include one or more central processing units (CPUs) 1222 (for example, one or more processors), a memory 1232, and one or more storage mediums 1230 (for example, one or more mass storage devices) storing an application 1242 or data 1244. The memory 1232 and the storage medium 1230 may be used for transient storage or permanent storage. A program stored in the storage medium 1230 may include one or more modules (not shown in the figure), and each module may include a series of instruction operations on the server. Furthermore, the CPU 1222 may be configured to communicate with the storage medium 1230, and perform on the server 1200 a series of instruction operations in the storage medium 1230.

The server 1200 may further include one or more power supplies 1226, one or more wired or wireless network interfaces 1250, one or more input/output interfaces 1258, and/or one or more operating systems such as Windows Server™, Mac OS X™, Unix™, Linux™, or FreeBSD™.

The steps performed by the server in the above embodiment may be based on the server structure shown in FIG. 12.

The CPU 1222 is configured to perform the following steps:

- respectively performing, through m reference object key point detection models, object key point detection processing on a target training image to obtain key point detection results respectively corresponding to the m reference object key point detection models, the key point detection result including a predicted position of a key point corresponding to each of a plurality of object key parts in a target training image, and M being an integer greater than 1;
- for each object key part, determining, according to a predicted position of a key point corresponding to the object key part in the m key point detection results, whether the object key part is a target object key part; when the object key part is the target object key part, determining, according to the predicted position of the key point corresponding to the target object key part in the m key point detection results, a labeling position corresponding to the target object key part;
- taking the target training image and a key point labeling result corresponding thereto as a training sample, the key point labeling result including the labeling position corresponding to each target object key part; and training the target object key point detection model based on the training sample.

In some embodiments, the CPU 1222 may further be configured to perform the steps of any implementation of the model training method provided by the embodiments of this application.

An embodiment of this application further provides a computer-readable storage medium, configured to store a computer program. The computer program is used for performing any implementation in the model training method described in various foregoing embodiments.

An embodiment of this application further provides a computer program product or a computer program. The computer program product or the computer program includes computer instructions. The computer instructions are stored in a computer-readable storage medium. A processor of a computer device reads the computer instruction from the computer-readable storage medium, and the processor executes the computer instructions, so that the computer device performs any implementation in the model training method described in various foregoing embodiments.

It may be clearly understood by a person skilled in the art that, for the purpose of convenience and brief description, for a specific working process of the above system, apparatus, and unit, reference may be made to a corresponding process in the foregoing method embodiments, and details are not described herein again.

In several embodiments provided by this application, it is to be understood that the disclosed system, apparatus, and method may be implemented in other manners. For example, the apparatus embodiment described above is only schematic, and for example, division of the units is only logic function division, and other division manners may be adopted during practical implementation. For example, a plurality of units or components may be combined or integrated into another system, or some characteristics may be neglected or not executed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in various embodiments of this application may be integrated into one processing unit, or each of the units may be physically separated, or two or more units may be integrated into one unit. The integrated unit may be implemented in the form of hardware, or may be implemented in the form of a software functional unit. It is further to be understood that, in this application, the term "module" is interchangeable with the term "unit".

When implemented in the form of a software functional unit and sold or used as an independent product, the integrated unit may be stored in a computer-readable storage medium. Based on such an understanding, the technical solutions of this application essentially, or the part contributing to the related technology, or all or some of the technical solutions may be implemented in the form of a software product. The computer software product is stored in a storage medium and includes several instructions for enabling a computer device (which may be a personal computer, a server, a network device, or the like) to perform all or some of the steps of the methods described in various embodiments of this application. The foregoing storage medium includes: various media that can store a computer program, such as a USB flash drive, a removable hard disk, a read-only memory (ROM), a RAM, a magnetic disk, or an optical disc.

It is to be understood that, in this application, "at least one" means one or more, and "a plurality of" means two or more. "And/or" describes an association relationship of associated objects and represents that three relationships may exist. For example, A and/or B may represent the following three cases: only A exists, only B exists, and both A and B exist, where A and B may be singular or plural. The character "/" generally represents an "or" relationship between the associated objects before and after. "At least one item (piece) of the following" or a similar expression thereof refers to any combination of these items, including any combination of singular item (piece) or plural item (piece). For example, at least one item (piece) of a, b, or c may represent: a, b, c, "a and b", "a and c", "b and c", or "a, b, and c", where a, b, and c may be singular or plural.

The foregoing embodiments are merely used for describing the technical solutions of this application, but are not intended to limit this application. Although this application has been described in detail with reference to the foregoing embodiments, it is to be appreciated by a person skilled in the art that, modifications may still be made to the technical solutions described in the foregoing embodiments, or equivalent replacements may be made to the part of the technical features; and these modifications or replacements do not cause the essence of corresponding technical solutions to depart from the spirit and scope of the technical solutions of the embodiments of the present disclosure.

What is claimed is:

1. A model training method performed by a computer device, comprising:

respectively performing, through a plurality of reference object key point detection models, object key point detection processing on a plurality of object key parts of a target object within a target training image to obtain a plurality of key point detection results respectively corresponding to the plurality of reference object key point detection models, a key point detection result of the plurality of key point detection results comprising a predicted position of a key point corresponding to each of the plurality of object key parts in the target training image, wherein a distance between the predicted positions of different reference object key point detection models for a same object key part in the target training image is below a threshold;

for each object key part whose associated predicted position of a key point corresponding to the object key part in the plurality of key point detection results indicates that the object key part is a target object key part, determining a labeling position corresponding to the target object key part as a corresponding key point labeling result; and training a target object key point detection model using the target training image and the key point labeling result corresponding thereto.

2. The method according to claim 1, wherein, when the target training image is a video frame in a target video, the method further comprises:

determining a video frame in the target video that is adjacent to the target training image as a reference training image;

acquiring a key point labeling result corresponding to the reference training image;

for each target object key part, determining a labeling position of the target object key part in the key point labeling result corresponding to the target training image as a first position, and a labeling position of the target object key part in the key point labeling result corresponding to the reference training image as a second position; and determining whether to reserve the first position in the key point labeling result corresponding to the target training image and the second position in the key point labeling result corresponding to the reference training image, respectively, according to a distance between the first position and the second position.

3. The method according to claim 1, wherein the respectively performing, through the plurality of reference object key point detection models, object key point detection processing on a plurality of object key parts of a target object within a target training image to obtain key point detection results respectively corresponding to the plurality of reference object key point detection models comprises:

for each reference object key point detection model, performing, through the reference object key point detection model, object key point detection processing on the target training image, and determine a confidence that each pixel in the target training image belongs to a respective one of the plurality of object key parts; and determining, according to the pixel with the confidence that the pixel belongs to the object key part in the target training image greater than a preset confidence, the key point detection result corresponding to the reference object key point detection model.

4. The method according to claim 1, wherein the training a target object key point detection model using the target training image and the key point labeling results corresponding thereto comprises:

performing, through the target object key point detection model, object key point detection processing on the target training image to obtain a training key point detection result corresponding to the target training image, the training key point detection result comprising a training predicted position of a key point corresponding to each of the plurality of object key parts;

constructing a target loss function according to the training key point detection result corresponding to the target training image and the key point labeling results; and adjusting a model parameter of the target object key point detection model based on the target loss function.

5. The method according to claim 4, wherein, when the target training image is a video frame in a target video, the method further comprises:

determining a video frame in the target video that is adjacent to the target training image as a reference training image;

acquiring a training key point detection result corresponding to the reference training image;

constructing a first reference loss function according to the training key point detection results respectively corresponding to the target training image and the reference training image; and adjusting, based on the target loss function and the first reference loss function, the model parameter of the target object key point detection model.

6. The method according to claim 5, wherein the method further comprises:

acquiring a first intermediate processing result and a second intermediate processing result generated from processing the target training image using the reference object key point detection model and the target object key point detection model, respectively;

constructing a second reference loss function according to the first intermediate processing result and the second intermediate processing result; and adjusting, based on the target loss function and the second reference loss function, the model parameter of the target object key point detection model.

7. A computer device, comprising a processor and a memory, the memory being configured to store a computer program; and the processor being configured to perform a model training method by executing the computer program, the model training method including:

respectively performing, through a plurality of reference object key point detection models, object key point detection processing on a plurality of object key parts of a target object within a target training image to obtain a plurality of key point detection results respectively corresponding to the plurality of reference object key point detection models, a key point detection result of the plurality of key point detection results comprising a predicted position of a key point corresponding to each of the plurality of object key parts in the target training image, wherein a distance between the predicted positions of different reference object key point detection models for a same object key part in the target training image is below a threshold;

for each object key part whose associated predicted position of a key point corresponding to the object key part in the plurality of key point detection results indicates that the object key part is a target object key part, determining a labeling position corresponding to the target object key part as a corresponding key point labeling result; and training a target object key point detection model using the target training image and the key point labeling result corresponding thereto.

8. The computer device according to claim 7, wherein, when the target training image is a video frame in a target video, the method further comprises:

determining a video frame in the target video that is adjacent to the target training image as a reference training image;

acquiring a key point labeling result corresponding to the reference training image;

for each target object key part, determining a labeling position of the target object key part in the key point labeling result corresponding to the target training image as a first position, and a labeling position of the target object key part in the key point labeling result corresponding to the reference training image as a second position; and determining whether to reserve the first position in the key point labeling result corresponding to the target training image and the second position in the key point labeling result corresponding to the reference training image, respectively, according to a distance between the first position and the second position.

9. The computer device according to claim 7, wherein the respectively performing, through the plurality of reference object key point detection models, object key point detection processing on a plurality of object key parts of a target object within a target training image to obtain key point detection results respectively corresponding to the plurality of reference object key point detection models comprises:

for each reference object key point detection model, performing, through the reference object key point detection model, object key point detection processing on the target training image, and determine a confidence that each pixel in the target training image belongs to a respective one of the plurality of object key parts; and determining, according to the pixel with the confidence that the pixel belongs to the object key part in the target training image greater than a preset confidence, the key point detection result corresponding to the reference object key point detection model.

10. The computer device according to claim 7, wherein the training a target object key point detection model using the target training image and the key point labeling results corresponding thereto comprises:

performing, through the target object key point detection model, object key point detection processing on the target training image to obtain a training key point detection result corresponding to the target training image, the training key point detection result comprising a training predicted position of a key point corresponding to each of the plurality of object key parts;

constructing a target loss function according to the training key point detection result corresponding to the target training image and the key point labeling results; and adjusting a model parameter of the target object key point detection model based on the target loss function.

11. The computer device according to claim 10, wherein, when the target training image is a video frame in a target video, the method further comprises:

determining a video frame in the target video that is adjacent to the target training image as a reference training image;

acquiring a training key point detection result corresponding to the reference training image;

constructing a first reference loss function according to the training key point detection results respectively corresponding to the target training image and the reference training image; and adjusting, based on the target loss function and the first reference loss function, the model parameter of the target object key point detection model.

12. The computer device according to claim 11, wherein the method further comprises:

acquiring a first intermediate processing result and a second intermediate processing result generated from processing the target training image using the reference object key point detection model and the target object key point detection model, respectively;

constructing a second reference loss function according to the first intermediate processing result and the second intermediate processing result; and adjusting, based on the target loss function and the second reference loss function, the model parameter of the target object key point detection model.

13. A non-transitory computer-readable storage medium storing a computer program that, when executed by a processor of a computer device, causes the computer device to perform a model training method including:

respectively performing, through a plurality of reference object key point detection models, object key point detection processing on a plurality of object key parts of a target object within a target training image to obtain a plurality of key point detection results respectively corresponding to the plurality of reference object key point detection models, the key point detection result of the plurality of key point detection results comprising a predicted position of a key point corresponding to each of the plurality of object key parts in the target training image, wherein a distance between the predicted positions of different reference object key point detection models for a same object key part in the target training image is below a threshold;

for each object key part whose associated predicted position of a key point corresponding to the object key part in the plurality of key point detection results indicates that the object key part is a target object key part, determining a labeling position corresponding to the target object key part as a corresponding key point labeling result; and training a target object key point detection model using the target training image and the key point labeling result corresponding thereto.

14. The non-transitory computer-readable storage medium according to claim 13, wherein, when the target training image is a video frame in a target video, the method further comprises:

determining a video frame in the target video that is adjacent to the target training image as a reference training image;

acquiring a key point labeling result corresponding to the reference training image;

for each target object key part, determining a labeling position of the target object key part in the key point labeling result corresponding to the target training image as a first position, and a labeling position of the target object key part in the key point labeling result corresponding to the reference training image as a second position; and determining whether to reserve the first position in the key point labeling result corresponding to the target training image and the second position in the key point labeling result corresponding to the reference training image, respectively, according to a distance between the first position and the second position.

15. The non-transitory computer-readable storage medium according to claim 13, wherein the respectively performing, through the plurality of reference object key point detection models, object key point detection processing on a plurality of object key parts of a target object within a target training image to obtain key point detection results respectively corresponding to the plurality of reference object key point detection models comprises:

for each reference object key point detection model, performing, through the reference object key point detection model, object key point detection processing on the target training image, and determine a confidence that each pixel in the target training image belongs to a respective one of the plurality of object key parts; and determining, according to the pixel with the confidence that the pixel belongs to the object key part in the target training image greater than a preset confidence, the key point detection result corresponding to the reference object key point detection model.

16. The non-transitory computer-readable storage medium according to claim 13, wherein the training a target object key point detection model using the target training image and the key point labeling results corresponding thereto comprises:

performing, through the target object key point detection model, object key point detection processing on the target training image to obtain a training key point detection result corresponding to the target training image, the training key point detection result comprising a training predicted position of a key point corresponding to each of the plurality of object key parts;

constructing a target loss function according to the training key point detection result corresponding to the target training image and the key point labeling results; and adjusting a model parameter of the target object key point detection model based on the target loss function.

17. The non-transitory computer-readable storage medium according to claim 16, wherein, when the target training image is a video frame in a target video, the method further comprises:

determining a video frame in the target video that is adjacent to the target training image as a reference training image;

acquiring a training key point detection result corresponding to the reference training image;

constructing a first reference loss function according to the training key point detection results respectively corresponding to the target training image and the reference training image; and adjusting, based on the target loss function and the first reference loss function, the model parameter of the target object key point detection model.

18. The non-transitory computer-readable storage medium according to claim 17, wherein the method further comprises:

acquiring a first intermediate processing result and a second intermediate processing result generated from processing the target training image using the reference object key point detection model and the target object key point detection model, respectively;

constructing a second reference loss function according to the first intermediate processing result and the second intermediate processing result; and adjusting, based on the target loss function and the second reference loss function, the model parameter of the target object key point detection model.

* * * * *